United States Patent [19]
Kuwahara et al.

[11] Patent Number: 5,969,082
[45] Date of Patent: *Oct. 19, 1999

[54] APPLICATION OF SULFONE, KETONE AND ESTER CONTAINING POLYALKYL ETHER UNITS TO MEDICAL MATERIALS

[75] Inventors: Hiroaki Kuwahara; Takeyuki Kawaguchi; Satoru Ohmori; Shunichi Matsumura, all of Iwakuni, Japan

[73] Assignee: Teijin Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/772,981

[22] Filed: Dec. 23, 1996

[30] Foreign Application Priority Data

| Dec. 26, 1995 | [JP] | Japan | 7-350788 |
| Mar. 29, 1996 | [JP] | Japan | 8-099586 |
| Apr. 12, 1996 | [JP] | Japan | 8-114351 |

[51] Int. Cl.$^6$ .............. C08G 2/00; C08G 75/00
[52] U.S. Cl. ............ 528/171; 528/125; 528/128; 528/220; 528/223; 528/373; 525/123; 525/189; 525/191; 525/212; 525/214; 525/419; 525/440; 525/471; 525/535; 525/906
[58] Field of Search .................... 528/171, 125, 528/128, 220, 223, 373; 525/123, 189, 191, 212, 214, 419, 440, 471, 535, 906; 264/41

[56] References Cited

U.S. PATENT DOCUMENTS

| 3,584,074 | 6/1971 | Shima et al. . |
| 4,897,453 | 1/1990 | Flora et al. . |
| 5,236,644 | 8/1993 | Parham et al. ............ 264/41 |
| 5,243,021 | 9/1993 | Langer et al. . |

FOREIGN PATENT DOCUMENTS

| A2 0150454 | 8/1985 | European Pat. Off. . |
| A2 0443457 | 8/1991 | European Pat. Off. . |
| 0576830 | 1/1994 | European Pat. Off. . |
| A1 0622488 | 11/1994 | European Pat. Off. . |
| 0739925 | 10/1996 | European Pat. Off. . |
| 51194 | 1/1976 | Japan . |
| 53010586 | 1/1978 | Japan . |
| 5477497 | 6/1979 | Japan . |
| 5818371 | 10/1983 | Japan . |
| 5847182 | 10/1983 | Japan . |
| 60240725 | 5/1984 | Japan . |
| 475052 | 11/1984 | Japan . |
| 536065 | 11/1985 | Japan . |
| 2135223 | 11/1988 | Japan . |
| 5220218 | 8/1993 | Japan . |
| 5345802 | 12/1993 | Japan . |
| 611789 | 2/1994 | Japan . |
| 2141723 | 1/1985 | United Kingdom . |

OTHER PUBLICATIONS

L. P. Joyce, M.C. Devries, W.S. Hastings, D.B. Olsen, R. K. Jarvik, W.J. Kolff: Trans. ASAIO, 29, 81 (1983).

Y. Mori et al., Trans. Am. Soc. Artif. Intern. Organs, 28,, 459 (1982).

E. W. Merril, V. Sa Da Costa, E. W. Salzman, D. Brier–Russell, L. Kirchner, D. F. Wangh, G. Trudel, S. Stopper, V. Vitale: Adv. Chem. Ser., 199, 95 (1982).

Bio Industry, 8 (6) (with partial translation) 412420 (1991).

Masaki Miyamoto, Sigeru Sasagawa, Yoshizo Terada, Shoji Nagaoka, Yuichi Mori, Polym. Prepr., Japan, 33, 2143 (1984).

Primary Examiner—Duc Truong
Attorney, Agent, or Firm—Sughrue, Mion, Zinn, Macpeak & Seas, PLLC

[57] ABSTRACT

A novel polyalkyl ether/polyaryl ether sulfone or ketone copolymer and a specific polyether ester copolymer are useful for producing a medical material to be used to contact the blood; and methods for producing the medical material comprising said polyalkyl ether/polyaryl ether sulfone or ketone copolymer or a specific polyether ester copolymer.

7 Claims, 6 Drawing Sheets

APPLICATION OF SULFONE, KETONE AND ESTER CONTAINING POLYALKYL ETHER UNITS TO MEDICAL MATERIALS

DETAILED DESCRIPTION OF THE INVENTION

This invention relates to the application of sulfone, ketone and ester containing polyalkyl ether units to medical materials. More specifically, it relates to the application of these compounds to medical materials, making use of their excellent blood compatibility.

In recent years, synthetic polymer materials have been widely used in medical materials such as artificial organs and catheters. Typical synthetic polymer materials for use in medical materials include hydrophobic polymers such as polyester, polyvinyl chloride, polystyrene, silicone resin, polymethacrylate and fluorine-containing resin; and hydrophilic polymers such as polyvinyl alcohol, polyether urethane (segmented polyurethane, SPU), poly(methacrylic acid-2-hydroxyethyl) and polyacrylamide. Most of these conventional materials have been used mainly from the viewpoint of their physical and mechanical properties, while SPU is known for its relatively excellent antithrombogenic property. Particularly, attempts have been made to apply Biomer®, Cardiothane® and the like to an artificial heart. However, satisfactory effects have been not yet obtained (B. Nylas, R. C. Reinbach, J. B. Caulfield, N. H. Buckley, W. G. Austen: J. Biomed, Mater. Res. Symp., 3,129 (1972); and L. P. Joyce, M. C. Devries, W. S. Hastings, D. B. Olsen, R. K. Jarvik, W. J. Kolff: Trans. ASAIO, 29,81 (1983)).

Polyethylene glycol which is a polyether having oxyethylene units covalently bonded in a chain form has high hydrophilic nature and low antigen properties and has been so far used as a nonionic surfactant, plasticizer or pharmaceutical base. Since polyethylene glycol has a hydroxyl group at both terminals of a polymer chain, hydrogel having a hydrophilic surface can be prepared by graft polymerizing it to a polymethacrylic acid (Y. Mori et al., Trans. Am. Soc. Artif. Intern. Organs, 28, 459 (1982)). Further, segmented polyurethane has been prepared by using polyethylene glycol as the hydrophilic phase of polyether urethane which is a bifunctional copolymer. It has been reported that these polymers can suppress the adhesion of platelets to the surface thereof (E. W. Merril, V. Sa Da Costa, E. W. Salzman, D. Brier-Russell, L. Kirchner, D. F. Wangh, G. Trudel, S. Stopper, V. Vitale: Adv. Chem. Ser., 199, 95 (1982)).

Meanwhile, along with progress in medical technology, there have been more and more chances for materials to contact with bio tissues or blood and the affinity of materials for living bodies has been becoming a big issue. Particularly, adhesion to the surface of a material and denaturation of bio components such as protein and blood corpuscles cause not only adverse effects on living bodies which are not observed normally, such as thrombus formation and inflammation reaction, but also degradation of the material. Therefore, these are the serious and radial problems of medical materials which must be solved immediately. For the prevention of blood coagulation on the surface of a material, a blood anti-coagulant typified by heparin has been continuously administered. However, in recent years, the effects of long-time administration of heparin (side effects such as liver troubles, e.g., lipid metabolism abnormality, prolonged bleeding time and an allergy reaction) have been called in question. Particularly, as for hemodialysis method for chronic renal failure patients who undergo blood purification such as hemodialysis or blood filtration, the development of a blood contacting material which does not need an anti-coagulant has been strongly desired.

At present, more than 100,000 patients undergo a blood purification in Japan. The principle of blood purification is to allow blood to contact with a dialysis solution through a membrane, disperse waste matters and metabolic products contained in the blood in the dialysis solution to remove them and further remove excess water by making use of pressure difference. A blood purifier is used for blood purification. This apparatus comprises a blood circuit consisting of a bundle of hollow yarns stored in a housing. The blood flows inside the hollow yarn and the dialysis solution flows outside the hollow yarn. As the material of a dialysis membrane for this blood purifier, a regenerated cellulose membrane, particularly regenerated cellulose membrane prepared by a copper ammonium method, has been widely used and greatly contributed to the prolongation of the life and the rehabilitation of a renal failure patient along with progress in a dialysis apparatus and dialytic technology. This is due to nothing but the fact that the regenerated cellulose membrane has excellent dialysis performance and mechanical strength and high safety supported by the results of actual long-time use. On the other hand, in spite of progress made in hemodialysis treatment, various problems arisen in dialysis are yet to be solved in fact. One of the main problems is a temporary reduction in the number of leukocytes due to the activation of complements contained in the blood by a cellulose polymer. Another one is various side effects which are considered to be caused by long-term administration of a large quantity of an anti-coagulant. As described above, for hemodialysis, a blood anti-coagulant typified by heparin has been continuously administered to suppress a blood coagulation reaction in a blood purifier. However, under the current circumstances where the solute removal performance of the blood purifier has been improved and the prolongation of life to 20 years is now possible, problems caused by the use of heparin have been reported one after another. Particularly, it has been revealed that the long-term administration of heparin causes side effects such as liver troubles, e.g., lipid metabolism abnormality, prolonged bleeding time and an allergy reaction. From this point of view, the development of a blood purifier which can reduce the amount of an anti-coagulant for blood purification treatment or which does not cause blood coagulation without using an anti-coagulant, that is, has antithrombogenic property has been ardently desired. Further, the antithrombogenic blood purifier makes it possible to hand-carry a whole apparatus, promote the rehabilitation of a patient which is confined to the hospital a few days a week for 5 hours and enhance his/her quality of life.

There have been proposed several methods for suppressing the activation of complements or improving antithrombogenic property without impairing other excellent properties of a regenerated cellulose membrane. For example, as for the suppression of the activation of complements, a method for fixing a polymer having a tertiary amino group to the surface, a method for grafting a hydrophilic polymer such as polyethylene oxide chain to the surface of the membrane by covalent bonding and the like have been reported and a certain measure of its effect of suppressing the activation of complements has been confirmed. However, it is still unsatisfactory in terms of the suppression of blood coagulation (antithrombogenic property). There have been reported several methods for improving antithrombogenic property, such as one for affixing heparin to the surface of a membrane (Japanese Laid-open Patent Application No. 51-194), one for providing antithrombogenic property by the modification of the surface of a membrane by means of a prostaglandin E1-cellulose derivative adsorption layer (Japanese Laid-open Patent Application No. 54-77497), one for graft polymerizing 2-methacryloyloxyethylphosphocholine (MPC) which is excellent antithrombogenic polymer and fixing it to the surface (BIO INDUSTRY, 8 (6), 412420 (1991)), one for fixing a chemically modified MPC graft cellulose derivative to hollow yarn (Japanese Laid-open Patent Applications Nos. 5-220218 and 5-345802) and the like. However, they are not sufficiently effective to solve such problems as the low stability of a physiologically active material, and still have many problems in high costs due to a complicated fixing method and difficulty of acquiring a homogeneous fixing surface layer, and have not been put to practical use yet.

All of the above hydrophobic polymer materials such as polyvinyl chloride and polymethacrylate and hydrophilic polymer materials such as polyvinyl alcohol and poly(methacrylic acid-2-hydroxyethyl) are not satisfactory in terms of mechanical strength, bio compatibility and the like. On the other hand, polyethylene glycol itself is water-soluble and hence, cannot be processed as a medical material. It has been verified by in vitro experiments that a methacrylic acid copolymer prepared by grafting a polyethylene glycol chain as a free terminal chain has the property of significantly damaging a cell membrane and causes a reduction in cell function due to the high mobility of polyethylene glycol or a free hydroxyl group which strongly interacts with a polar group contained in vivo though it relatively suppresses the adhesion of platelets (Masaki Miyamoto, Shigeru Sasagawa, Yoshizo Terada, Shoji Nagaoka, Yuichi Mori, Polym, Prepr., Jpn., 33, 2143 (1984)). Therefore, the above material is not suitable for use in a medical material which must be safe.

Further, in segmented polyurethane such as Biomer® or Cardiothane®, the adhesion of platelets is suppressed by a micro-phase separation structure between a hard aromatic urethane bonding site and a soft polyether bonding site, but its effect is not always satisfactory. Particularly, since a partial structure of hydrogen bonding, such as urethane bonding and urea bonding has strong interaction between the polar groups of a main chain though it contributes to improvement in the hardness of a molecular chain, the hydration of water molecules capable of lightening hydrophobic interaction is checked. Therefore, it has been reported that the structure induces the denaturation of protein when the protein contained in the blood is adsorbed, and promotes the adhesion of platelets. Generally speaking, polar sites such as a hydroxyl group and amino group induce the activation of complements (second route) at the time when contacting the blood and causes thrombus formation due to the promotion of fibrin formation.

A cellulose triacetate membrane which is a semi-synthetic polymer has both merits of cellulose and a synthetic polymer and exhibits higher ability to suppress the activation of complements over regenerated cellulose, and its water permeability and material permeability are well balanced. In addition, since it has sufficient mechanical strength, it rarely suffers from the production of pin holes. Therefore, its research and development is now under way as a dialysis membrane material substituting regenerated cellulose and its sufficient performance has been confirmed by therapeutical and clinical results. However, this cellulose triacetate membrane is still unsatisfactory in terms of antithrombogenic property, and the development of a novel antithrombogenic membrane which can reduce the use of an anti-coagulant is desired.

Japanese Laid-open Patent Application No. 5-36065 discloses an antithrombogenic medical material which is composed of a polyester-based copolymer containing 80 to 50 mol % of terephthalic acid, 20 to 50 mol % of an acid other than terephthalic acid and 5 to 40% by weight of polyalkylene glycol consisting of glycol having a molecular weight of 250 or less and polyalk-ylene glycol having a number average molecular weight of about 3,000 to 60,000.

Japanese Patent Publication No. 58-47182 discloses a blood transport tube or blood container which is composed of a polyester-polyether block copolymer containing 5 to 85% by weight of poly(alkyleneoxide)glycol units having a number average molecular weight of 800 to 6,000 and a carbon atom/oxygen atom ratio of 2.5 to 4.3.

Japanese Laid-open Patent Application No. 58-183171 teaches a blood transport tube or a blood handling tool which comprises a polyester-polyether block copolymer and a polyvinyl chloride resin dispersed uniformly in a micro-phase dispersion state.

Japanese Patent Publication No. 4-7505:2 discloses selective permeable hollow yarn for hemodialysis which is prepared by melt-spinning a block copolymer comprising condensed hydrophobic polymer components having a water absorption of 1.0% or less and polyoxyalkylene, and orienting the yarn in a lengthwise direction of the yarn by drafting or drawing. The above prior art teaches a polysulfone as one of the condensed hydrophobic polymer components but fails to disclose specific examples of the polysulfone.

Japanese Patent Publication No. 6-117139 discloses a process for providing hydrophilic nature to an aromatic polysulfone, which comprises reacting an aromatic polysulfone having (1) a benzene ring containing a halogen group which is activated by a sulfonyl group present at a p-position of a molecular terminal and eliminated by a nucleophilic substitution and (2) recurring units represented the following formula:

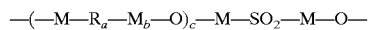

or

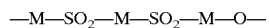

wherein M is the same or different and an aromatic group, R is a divalent organic group, and a, b and c are each 0 or 1, with a polyol under alkaline conditions to bond the polyol to the molecular terminus of the aromatic polysulfone via an ether bond.

An object of the present invention is to provide a novel polyalkyl ether/polyaryl ether sulfone copolymer or polyalkyl ether/polyaryl ether ketone copolymer.

Another object of the present invention is to provide the use of the above novel copolymer or a specific polyether ester as a starting material for a medical material or a coating material thereof.

Still another object of the present invention is to provide a medical material which is composed of a composition comprising, as part of the material, the above novel copolymer of the present invention or a specific polyether ester.

A further object of the present invention is to provide the above novel composition constituting the above medical material of the present invention.

A still further object of the present invention is to provide an industrially advantageous method for producing the medical material of the present invention.

The above and other objects and advantages of the present invention will become apparent from the following description.

According to the present invention, firstly, the above objects and advantages of the present invention can be attained by a polyalkyl ether/polyaryl ether sulfone or ketone copolymer which has a reduced viscosity, measured at 35° C. in a mixed solvent having a phenol/1,1,2,2-tetrachloroethane weight ratio of 6/4, of at least 0.5 dl/g and which essentially consists of recurring units represented by the following formula (1):

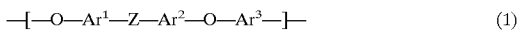     (1)

wherein $Ar^1$, $Ar^2$ and $Ar^3$ are the same or different and each a divalent aromatic hydrocarbon group which may be substituted and Z is >C=O or >SO$_2$, and recurring units represented by the following formula (2):

     (2)

wherein R is an alkylene group having 2 or 3 carbon atoms or a combination of an alkylene group having 2 or 3 carbon atoms and an alkylene group having 4 carbon atoms, $Ar^3$ is defined the same as above, and n is a numeral which ensures that the molecular weight of a unit represented by —(OR)$_n$— is in the range of 400 to 20,000, at least two on the average of the recurring unit represented by the above formula (2) being present in the molecule and the proportion of the unit represented by —(OR)$_n$— in the above formula (2) being 10 to 90% by weight based on the total weight of the recurring units (1) and (2).

Figure 1:
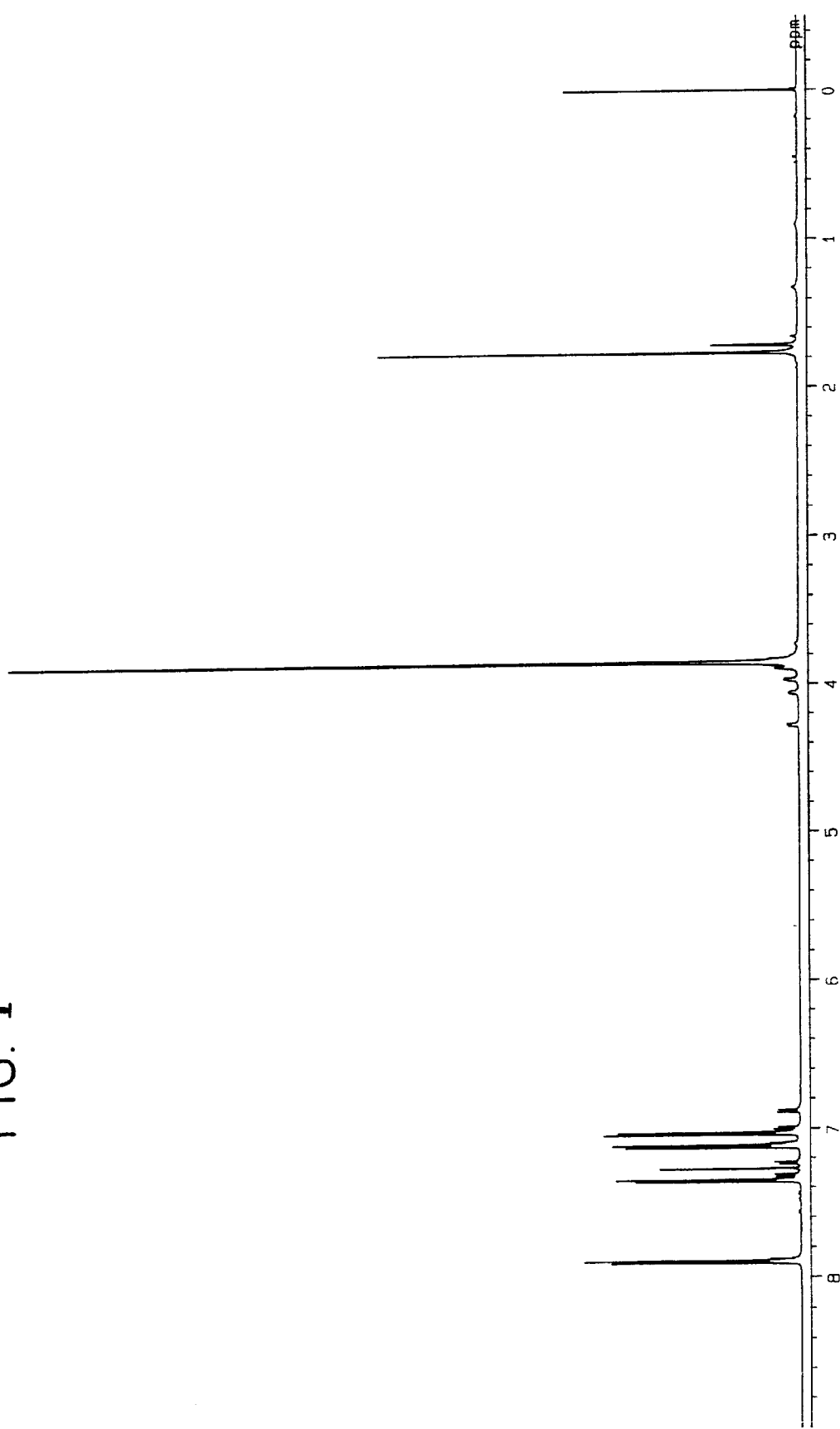
FIG. 1 is an NMR chart of a polyalkyl ether/polyaryl ether sulfone copolymer obtained in Example 2.

The polyalkyl ether/polyaryl ether sulfone copolymer and polyalkyl ether/polyaryl ether ketone copolymer of the present invention essentially consist of the recurring units represented by the above formulas (1) and (2).

$Ar^1$, $Ar^2$ and $Ar^3$ in the formula (1) are the same or different and each a divalent aromatic hydrocarbon group which may be substituted. In the case of the polyalkyl ether/polyaryl ether sulfone copolymer, the aromatic hydrocarbon group is selected from the group consisting of p-phenylene, m-phenylene, 2,6-naphthylene, 2,7-naphthylene, 1,4-naphthylene, 1,5-naphthylene, 4,4'-biphenylene, 2,2'-biphenylene, 4,4'-oxylenediphenylene, 4,4'-isopropylidenediphenylene, 4,4'-isopropylidene-2,2',6,6'-tetramethyldiphenylene, 4,4'-sulfonyldiphenylene and the like. Out of these, $Ar^1$ and $Ar^2$ are preferably p-phenylene and $Ar^3$ is preferably 4,4'-isopropylidenediphenylene, 4,4'-oxylenediphenylene, 4,4'-isopropylidene-2,2',6,6'-tetramethyldiphenylene, 4,4'-sulfonyldiphenylene or the like. In this case, when $Ar^3$ in the formula (1) contains a sulfone bond(—SO$_2$—), it is preferable that $Ar^3$ is not identical with the group of —$Ar^1$—SO$_2$—$Ar^2$—.

In the case of the polyalkyl ether/polyaryl ether ketone copolymer, the aromatic hydrocarbon group is selected, for example, from the group consisting of p-phenylene, m-phenylene, 2,6-naphthylene, 2,7-naphthylene, 1,4-naphthylene, 1,5-naphthylene, 4,4'-biphenylene, 2,2'-biphenylene, 4,4'-oxylenediphenylene, 4,4'-ketodiphenylene and the like. Out of these, $Ar^1$ and $Ar^2$ are preferably p-phenylene, 4,4'-oxylenediphenylene and 4,4'-ketodiphenylene, and $Ar^3$ is preferably p-phenylene, 4,4'-methylenediphenylene or the like.

In the formula (2), R is an alkylene group having 2 or 3 carbon atoms or a combination of an alkylene group having 2 or 3 carbon atoms and an alkylene group having 4 carbon atoms. Illustrative examples of the alkylene group having 2 or 3 carbon atoms include ethylene, propylene and trimethylene. R is particularly preferably ethylene. Illustrative examples of the alkylene group having 4 carbon atoms are tetramethylene or the like. R may be one or a combination of two or more of these. In the case of a combination of an alkylene group having 2 or 3 carbon atoms and an alkylene group having 4 carbon atoms, the proportion of the alkylene group having 4 carbon atoms is preferably up to 80 mol %, more preferably up to 60 mol %. n is a numeral which ensures that the molecular weight of a polyoxyalkylene structure unit represented by —(RO)$_n$— is in the range of 400 to 20,000. The molecular weight of the polyoxyalkylene structure unit is preferably 600 to 15,000, more preferably 800 to 10,000, particularly preferably 1,000 to 6,000.

The copolymer of the present invention comprises at least two on the average of the recurring unit represented by the above formula (2) in the molecule.

The copolymer of the present invention which consists of the smallest numbers of the recurring units is a copolymer consisting of one recurring unit of the formula (1) and two recurring units of the formula (2).

Further, the copolymer of the present invention contains the structural unit —(RO)$_n$— in the formula (2) in a proportion of 10 to 90% by weight based on the total weight of the recurring units of the formulas (1) and (2). If the proportion is less than 10% by weight, the resulting copolymer will have too high hydrophobic nature and unsatisfactory wetability when it is formed into a dry film. If the proportion is more than 90% by weight, the resulting copolymer will have too high hydrophilic nature and may dissolve in water, significantly swell or have insufficient mechanical strength. The structural unit —(RO)$_n$— is preferably contained in a proportion of 30 to 80% by weight, more preferably 40 to 70% by weight based on the same standard.

Further, the copolymer of the present invention has a reduced viscosity, measured at 35° C. and at a concentration of 1.2 g/dl in a mixed solvent having a phenol/1,1,2,2-tetrachloroethane weight ratio of 6/4, of at least 0.5 dl/g.

If the viscosity is less than 0.5 dl/g, the resulting copolymer will have insufficient mechanical strength. The reduced viscosity is preferably at least 1.0 dl/g, more preferably 1.0 to 3.0 dl/g.

The copolymer of the present invention can be produced in the following manner, for example.

Bis(haloaryl)sulfone or ketone represented by the following formula (3):

     (3)

wherein $Ar^1$, $Ar^2$ and Z are defined the same as above and X is a halogen atom, α,ω-bis(haloalkoxy)polyoxyalkylene represented by the following formula (4):

$$X-R-(OR)_{n-1}-X \quad (4)$$

wherein R, n and X are defined the same as above, and a dihydroxyaryl compound represented by the following formula (5):

$$HO-Ar^3-OH \quad (5)$$

wherein $Ar^3$ is defined the same as above, are heated in the presence of an alkali to allow them to react with each other.

In the formula (3), X is selected from fluorine, chlorine, bromine and iodine. X is preferably chlorine.

Illustrative examples of the bis(haloaryl)sulfone represented by the formula (3) include bis(4-fluorophenyl) sulfone, bis(4-chlorophenyl)sulfone, bis(3-fluorophenyl) sulfone, bis(3-chlorophenyl)sulfone, 3-fluorophenyl-4'-fluorophenylsulfone, 3-chlorophenyl-4'-chlorophenylsulfone and the like.

Illustrative examples of the bis(haloaryl)ketone represented by the formula (3) include bis(4-fluoro) benzophenone, bis(4-chloro)benzophenone, 3,3'-difluorobenzophenone, 3,3'-dichlorobenzophenone, 3,4'-difluorobenzophenone, 3,4'-dichlorobenzophenone and the like.

Before giving illustrative examples of α,ω-bis (haloalkoxy)polyoxyalkylene represented by the formula (4), there are exemplified specific examples of the dihydroxyaryl compound represented by the above formula (5), which include bis(4-hydroxyphenyl)methane, hydroquinone, bis(4-hydroxyphenyl)ether, 4,4'-dihydroxybiphenyl, 1,5-dihydroxynaphthalene, 2,3-dihydroxynaphthalene, 2,7-dihydroxynaphthalene and the like.

In the formula (4), X is exemplified the same as those in the formula (3).

Preferred examples of the α,ω-bis(haloalkoxy) polyoxyalkylene represented by the formula (4) include α,ω-bis(2-bromoethoxy)polyoxyethylene, α,ω-bis(2-chloroethoxy)polyoxyethylene, α,ω-bis(2-bromo-1-methylethoxy)polyoxyisopropylene, α,ω-bis(2-chloro-1-methylethoxy)polyoxyisopropylene and α,ω-bisbromo and/or chloro product of a polyoxyethylene-polyoxyisopropylene block copolymer.

The α,ω-bis(2-haloalkoxy)polyoxyalkylene used in the present invention can be synthesized by various methods. Typical methods are as follows:

(i) one in which polyoxyalkylene glycol and phosphorus halide are reacted with each other in the presence of a base; and (ii) one in which polyoxyalkylene glycol and thionyl halide are reacted with each other in the presence of a base.

In the above method (i), phosphorus halide is added dropwise to corresponding polyoxyalkylene glycol and a base in the presence of an arbitrary solvent and the resulting mixture is heated and stirred to produce the α,ω-bis(2-haloalkoxy)polyoxy-alkylene. When the number of moles of the polyoxyalkylene glycol is taken as (A) and the number of moles of the phosphorus halide is taken as (B), they must satisfy the following formula (6).

$$0.75 \leq (B)/(A) \leq 2 \quad (6)$$

When the value of (B)/(A) is too large, the quantity of the phosphorus halide is excessive and of waste. When the value is too small, an end material cannot be obtained at a high yield. It is preferable from a view point of reactivity that the phosphorus halide used in this method is phosphorus tribromide.

Any solvent is acceptable if it can dissolve and mix these reactive components and does not contain a functional group which reacts with the phosphorus halide, such as hydroxyl group, primary or secondary amino group or the like, and may be selected, for example, from methylene chloride, chloroform, carbon tetrachloride, 1,2-dichloroethane, tetrahydrofuran, carbon disulfide and the like. From a viewpoint of solubility and simplicity of reaction operation, methylene chloride and chloroform are preferred.

The amount of the solvent is preferably 1.0 to 10.0 times, more preferably 2.0 to 5.0 times, the total weight of reaction substrates. When the amount of the solvent is below the above range, the reaction substrates will separate out, whereas when the amount of the solvent is above the above range, the purification operation of the product will become complicated or reaction efficiency may deteriorate.

As the base, there may be used known organic bases such as pyridine, triethylamine, N,N'-tetramethylethylenediamine, HMPA (hexamethyltriamide phosphate), DBU (1,8-diazabicyclo[5.4.0]undecene-7) and the like, out of which pyridine is preferred.

Although the base is used in an amount of 1.5 to 3.0 equivalents of phosphorus halide, the optimal amount thereof differs depending on type of the base and reaction conditions such as the value of (B)/(A) in the above formula (6). For example, when pyridine is used as the base, methylene chloride is used as the solvent and (B)/(A) is 0.75, pyridine is preferably used in an amount of about 3.0 equivalents of the phosphorus halide.

The reaction temperature may be equal to or lower than room temperature if raw material components are not crystallized from the solvent. When a solvent having a boiling point of 100° C. or less is used, a reaction may be carried out at a solvent reflux temperature. However, when phosphorus halide is added dropwise to a mixture solvent of a base and polyoxyalkylene glycol in an early stage of a reaction, there may be such risks as abrupt heat generation and bumping during operation. Therefore, the temperature is preferably maintained at 0 to 5° C. by cooling with ice during dropping. When the reaction temperature exceeds 100° C., a side reaction occurs and the yield of an end substance decreases, whereas when the reaction temperature is too low, the reaction rate lowers. When phosphorus tribromide is used as the phosphorus halide, the reaction temperature is preferably 30 to 50° C.

In the above method (ii), thionyl halide of a first stage is added dropwise to and mixed with corresponding polyoxyalkylene glycol and a base in the presence of an arbitrary solvent to cause reaction, and the same amount of thionyl halide of a second stage is added to the reaction product, heated and stirred to synthesize the end substance. The first-stage and second-stage reactions are shown by the following formulas (7) and (8).

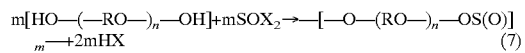

$$m[HO-(-RO-)_n-OH]+mSOX_2 \rightarrow [-O-(RO-)_n-OS(O)]_m + 2mHX \quad (7)$$

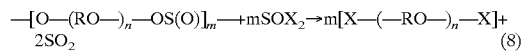

$$-[O-(RO-)_n-OS(O)]_m + mSOX_2 \rightarrow m[X-(-RO-)_n-X]+ 2SO_2 \quad (8)$$

Therefore, when the number of moles of polyoxyalkylene glycol is taken as (A), the numbers of moles of thionyl halide are taken as B1 (the number of moles in the first stage) and B2 (the number of moles in the second stage), the reaction conditions are set to satisfy the following formulas (9) and (10).

$$(B1)/(A)=1 \qquad (9)$$

$$(B2)/(A)=1 \qquad (10)$$

In other words, thionyl chloride may be used in an amount of double the molar equivalent of polyoxyalkylene glycol. In this respect, when the value of (B1 or B2)/(A) is too large, the quantity of the thionyl halide is in excess and of waste. When the value is too small, an end material cannot be obtained at a high yield. The thionyl halide used in this method is preferably thionyl chloride from a view point of reactivity.

As in the above method (i), any solvent is acceptable if it can dissolve and mix these reactive components and does not contain a functional group which reacts with the thionyl halide, such as hydroxyl group, primary or secondary amino group or the like, and may be selected, for example, from methylene chloride, chloroform, carbon tetrachloride, 1,2-dichloroethane, tetrahydrofuran, carbon disulfide and the like. From a viewpoint of solubility and simplicity of reaction operation, methylene chloride is preferred. The quantity of the solvent and the reaction temperature are the same as in the above method (i).

The type of the base used is also pursuant to those in the above method (i), and pyridine is preferably used. The base is used in an amount of 2.0 equivalents or slightly more (e.g., 2.1 equivalents) of thionyl halide which has been added in the first-stage reaction, but it is not necessary to add the base in the second-stage reaction. The optimal amount of the base added in the first-stage reaction, which differs depending on type of the base, may be a theoretical value which can neutralize hydrochloric acid by-produced. For example, when pyridine is used as the base and polyoxyalkylene glycol is chlorinated with thionyl chloride, pyridine is preferably used in an amount of 2.0 equivalents of thionyl halide added in the first stage.

The reaction is carried out as follows. Bis(halo-aryl) sulfone or ketone and α,ω-bis(haloalkoxy)polyoxy-alkylene represented by the above formulas (3) and (4) are charged and mixed with the dihydroxyaryl compound represented by the above formula (5) such that the total number of moles of the first two substances becomes almost equal to the number of moles of the latter compound, and caused to react with an alkali in the presence of an appropriate solvent. Various copolymers having different compositions and a polyoxyalkylene structure unit content of 10 to 90% by weight based on the resulting copolymer can be obtained by changing the amount charged of the bis(haloaryl)sulfone or ketone and α,ω-bis(haloalkoxy)polyoxyalkylene. The reaction temperature is preferably 120 to 400° C., more preferably 160 to 350° C. When the reaction temperature is higher than 400° C., a side reaction or the decomposition of the starting materials is liable to occur, whereas when the reaction temperature is lower than 120° C., the reaction becomes slow.

As the alkali used in the reaction, an alkali metal carbonate or hydroxide is preferred, and examples thereof include lithium carbonate, potassium carbonate, sodium carbonate, lithium hydroxide, sodium hydroxide, potassium hydroxide, lithium hydrogen carbonate, sodium hydrogen carbonate, potassium hydrogen carbonate and the like. Of these, carbonates, especially potassium carbonate is preferred. The amount of the alkali must be such that it can substantially neutralize hydrogen halide produced during the reaction. Practically, even if the amount is 5% larger or smaller than the theoretical value, the reaction can be carried out. An appropriate plasticizer or solvent may be used in the reaction. Examples of the appropriate solvent include diphenyl sulfone, N-methyl pyrrolidone, N,N-dimethylacetoamide, dimethylsulfoxide and the like, out of which N,N-dimethylacetamide and diphenylsufone are preferred.

An additive may be added to promote the reaction. Examples of such additive are metals or salts thereof, clathrate compounds, chelating agents, organic metal compounds and the like.

The thus obtained copolymer of the present invention has an extremely small amount of protein adsorbed, measured by a Micro-BCA method, when contacting human blood plasma at 37° C. for 1 hour, that is, 0.7 $\mu g/cm^2$ or less. Therefore, the copolymer has an excellent adsorption suppression effect against the adhesion of protein and platelets contained in the blood when contacting a blood plasma solution. The amount of protein adsorbed is desirably as small as possible, while if it is in the range of 0.3 to 0.7 $\mu g/cm^2$, the copolymer exhibits actually sufficient effect.

The above copolymer of the present invention not only can be advantageously used as a protein filtration membrane, support film for a permeable membrane, medical hemodialysis membrane and agent for imparting antithrombogenic property to medical polymer but also is useful as an ultrafiltration membrane, precision filtration membrane and the like.

Therefore, the present invention has made it clear that both of the above polyalkyl ether/polyaryl ether sulfone copolymer and polyalkyl ether/polyaryl ether ketone copolymer of the present invention are advantageously used to produce a medical material to be used to contact the blood.

According to the present invention, there is provided the use of the above copolymers of the present invention to produce a medical material to be used to contact the blood.

This use include not only use of the copolymer of the present invention as a starting material of a medical material but also use of the copolymer as a coating material for coating a medical material prepared from other materials. Illustrative examples of the other materials for preparing a medical material include polysulfone, polyaryl ether sulfone, cellulose, cellulose triacetate, polyurethane, polycarbonate, aromatic polyester such as polyethylene terephthalate, polyethylene, polypropylene, polyvinyl chloride, polystyrene, silicone resin, polymethacrylates such as polymethyl methacrylate, fluororesin, polyvinyl alcohol, poly(methacrylic acid-2-hydroxyethyl), polyacrylamide and the like.

Of these, polysulfone, polyaryl ether sulfone, cellulose triacetate, polypropylene, polyurethane and polycarbonate are preferred in the present invention.

According to a first preferred aspect of the present invention, there is provided the use of the above polyalkyl ether/polyaryl ether sulfone or ketone copolymer (A) of the present invention for coating the blood-contacting surface of a medical material to be used to contact the blood, which is formed from at least one polymer (B) selected from the group consisting of polysulfone, polyaryl ether sulfone, cellulose triacetate, polypropylene, polyurethane and polycarbonate.

According to a second preferred aspect of the present invention, there is provided the use of a polymer composition comprising 1 to 99 parts by weight of the above polyalkyl ether/polyaryl ether sulfone or ketone copolymer (A) of the present invention and 1 to 99 parts by weight of the above polymer (B) as a starting material for producing a medical material to be used to contact the blood. In the above polymer composition, the total weight of the copolymer (A) and the polymer (B) is 100 parts by weight.

The polymer composition comprising 1 to 99 parts by weight of the above copolymer (A) and 1 to 99 parts by weight of the above polymer (B) is novel by itself and is an object claimed by the present invention.

A description is first given of the first preferred aspect of the present invention.

The polymer (B) which is a starting material constituting a medical material is preferably polysulfone, polyaryl ether sulfone, cellulose triacetate, polyvinylchloride, polypropylene, polyurethane or polycarbonate as described above. They may used alone or in combination of two or more.

As the polysulfone and polyaryl ether sulfone may be preferably used a homopolymer or copolymer of an aromatic polysulfone which is composed of recurring units represented by the following formula (11):

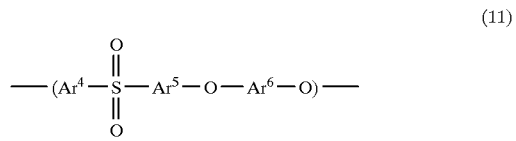

(11)

wherein $Ar^4$, $Ar^5$ and $Ar^6$ are the same or different and each a divalent aromatic hydrocarbon group which may be substituted.

Preferably, this polymer has a reduced viscosity, measured at 35° C. and at a concentration of 1.2 g/dl in a phenol/1,1,2,2-tetrachloroethane mixed solvent (weight ratio of 6/4), of 0.5 to 3.0.

In the above formula (11), illustrative examples of the aromatic hydrocarbon group represented by $Ar^4$, $Ar^5$ and $Ar^6$ are the same as those for $Ar^1$, $Ar^2$ and $Ar^3$ in the formula (1).

Of the examples, aromatic polysulfone of a medical grade such as (a) aromatic polysulfone (specific gravity of 1.24 and glass transition point of 190° C.) having a number average molecular weight of 20,000 to 30,000 and obtained by heat-condensing 2,2'-bis(4-hydroxyphenyl)propane and 4,4'-dichlorodiphenylsulfone or (b) polyaryl ether sulfone (specific gravity of 1.37 to 1.60 and glass transition point of 220° C.) having a number average molecular weight of 20,000 to 30,000 and obtained by heat-condensing 4,4'-dihydroxydiphenylsulfone and 4,4'-dichlorodiphenylsulfone are preferred.

Preferably, the cellulose triacetate has a number average molecular weight of 30,000 to 300,000 and an acetylation degree of 2.8 or more.

As the polypropylene may be used a low-molecular-weight polymer of medical grade, which may be either a homopolymer or a random or block copolymer copolymerized with other olefin such as ethylene or the like, from the purpose of affording processability and flexibility, as far as it has a number average molecular weight of 100,000 or more and is free from elution of impurities.

Preferably, the polyurethane has a number average molecular weight of 20,000 to 30,000 and is obtained by polyaddition of methylenediphenyl-4,4'-diisocyanate and ethylene glycol.

Preferably, the polycarbonate is obtained by polycondensing a bisphenol derivative such as 4,4'-isopropylidenediphenol and phosgene or diphenylcarbonate, and particularly preferably has a number average molecular weight of 20,000 to 50,000.

Coating of the blood contacting surface of a medical material can be effected by dissolving the above copolymer (A) of the present invention in an organic solvent capable of dissolving the copolymer, immersing the medical material formed from the above material in the resulting polymer solution and drying to remove the organic solvent.

The polymer solution may be applied to the medical material by brushing in place of immersion.

The polymer solution preferably has a polymer concentration of 0.1 to 10% by weight, more preferably 0.5 to 2% by weight.

When the polymer concentration is lower than 0.1% by weight, it is difficult to coat the surface completely and the surface is likely to have partially non-uniform coating. When the polymer concentration is higher than 10% by weight, the viscosity of the solution is too high to make coating smoothly, with the result that the thickness of the coating film is apt to become non-uniform.

Illustrative examples of the organic solvent include cyclic ether-based solvents such as tetrahydrofuran, 1,3-dioxolane and 1,4-dioxane; amide-based organic solvents such as N,N'-dimethylformamide (DMF), N,N'-dimethylacetoamide (DMAc) and N-methyl-2-pyrrolidone (NMP); and halogen-based organic solvents such as chloroform and methylene chloride.

The organic solvent contained in the polymer solution applied to the medical material is removed by drying at ordinary temperatures under ordinary pressures or at 40 to 50° C. under a reduced pressure, or by extracting the solvent in a poor solvent for both of the above polymers, such as ethanol, whereby a coating film layer of the above copolymer is formed on the medical material.

Examples of the medical material include hollow yarn for artificial kidney, hollow yarn for artificial lung, catheter, artificial blood vessel, blood-collecting tube, tube for blood circuit, blood container, hemodialysis membrane, plasma skimming membrane and medical suture.

At least the blood contacting surface of the medical material is covered with the thin film of the above copolymer of the present invention. The "blood contacting portion" denotes the surface of the material, which contacts the blood, and a neighboring portion thereof. For instance, when the medical material is used as a dialysis membrane for an artificial kidney, at least the interior of the membrane which the blood runs through may be formed from the above copolymer.

The coating film formed on the medical material preferably has a thickness of 10 nm to 10 $\mu$m, more preferably 100 nm to 1 $\mu$m.

A description is subsequently given of the second preferred aspect of the present invention.

The polymer composition comprises 1 to 99 parts by weight of the above copolymer (A) of the present invention and 1 to 99 parts by weight of the polymer (B). The total weight of the copolymer (A) and the polymer (B) is 100 parts by weight. The polymer (B) is the same as in the first preferred aspect of the present invention.

When the amount of the copolymer (A) is less than 1 part by weight, the amount of the copolymer (A) present on the surface of a medical material is too small and hence, a satisfactory antithrombogenic effect cannot be obtained. When the amount of the copolymer (A) is more than 99 parts by weight, disadvantageously, the inherent physical properties and use conditions of the copolymer (A) greatly change depending on type of the polymer (B).

Preferably, the polymer composition comprises 1 to 50 parts by weight of the above copolymer (A) and 50 to 99 parts by weight of the polymer (B) (the total weight of both materials is 100 parts by weight), more preferably 10 to 30 parts by weight of the above copolymer (A) and 70 to 90 parts by weight of the polymer (B).

The polymer composition can be prepared, for example, by dissolving the copolymer (A) and the polymer (B) in an organic solvent in the above predetermined ratio and then, removing the organic solvent, or by melt-mixing the copolymer (A) and the polymer (B) in the above predetermined ratio.

As the organic solvent may be used the same organic solvent as used in the first aspect of the present invention.

In the above polymer composition, the copolymer (A) and the polymer (B) form separate phases without being mixed uniformly in a molecular level, and are present as separate phases.

According to the present invention, by making use of the above properties of the polymer composition, there is provided a medical material to be used to contact the blood, which is characterized in that at least a portion thereof having a surface used to contact the blood is formed from a polymer composition comprising the polyalkyl ether/polyaryl ether sulfone or ketone copolymer (A) and the polymer (B) and that the concentration of the copolymer (A) in the vicinity of the surface of the portion is higher than the concentration of the above copolymer (A) contained in the whole polymer composition forming the portion.

In this medical material, the polymer composition preferably comprises 5 to 20 parts by weight of the copolymer (A) and 80 to 95 parts by weight of the polymer (B) (the total weight of both materials is 100 parts by weight) and the proportion of the copolymer (A) in the vicinity of the surface is 50 to 90 parts by weight based on the same standard.

The proportion of the copolymer (A) in the vicinity of the surface is higher than the proportion (concentration) of the copolymer (A) contained in the whole polymer composition when a medical material is produced from an organic solvent solution of the polymer composition. In other words, as the organic solvent is scattered from the solution, phase separation occurs and a medical material having a high concentration of the copolymer (A) in the vicinity of the surface is obtained in the end. The "vicinity of the surface" as used herein means an area down to a depth of about 100 Å from the surface.

According to the present invention, a medical material having a thin portion to be used to contact the blood is advantageously produced by the following method in particular.

That is, according to the present invention, there is further provided a method for producing a medical material, which comprises the steps of:

preparing a dope comprising the polyalkyl ether/polyaryl ether sulfone or ketone copolymer (A), the polymer (B) and an aprotic polar organic solvent (C) capable of dissolving these, the total concentration of the above components (A) and (B) being 1 to 30% by weight;

forming this dope into a thin film; and subjecting the thin film to a wet or dry molding method to produce a medical material having a 1 mm or less thick portion to be used to contact the blood.

As the aprotic polar organic solvent are advantageously used tetrahydrofuran, 1,3-dioxolane, 1,4-dioxane, dimethylformamide, dimethylacetoamide, N-methyl-2-pyrrolidone, dimethylsufoxide, methylene chloride and chloroform.

The dope can be formed into a thin film, for example, by casting it on a substrate or spinning it into hollow yarn.

The total concentration of the components (A) and (B) contained in the dope is preferably 5 to 20% by weight, more preferably 10 to 15% by weight in the case of casting and preferably 5 to 30% by weight, more preferably 10 to 20% by weight, particularly preferably 13 to 14% by weight in the case of spinning into hollow yarn.

After the dope is formed into a thin film, the aprotic polar organic solvent is removed from the dope by a wet or dry method to provide a medical material as an independent molded article.

The wet method is a method comprising removing the aprotic organic solvent contained in the dope by treating the thin film of the dope in water/aprotic organic solvent and then water. The dry method is a method comprising removing the aprotic organic solvent contained in the dope by treating the thin film of the dope at ordinary temperatures under ordinary pressures or at 40 to 50° C. under a reduced pressure of 1 to 30 mmHg.

The thin film which is the blood contacting portion of the thus obtained medical material preferably has a thickness of 1 $\mu$m to 1 mm. In the case of hollow yarn, in particular, it is advantageous that it should have a film thickness of 10 to 50 $\mu$m.

When all of the medical materials of the present invention described above are allowed to contact to a phosphoric acid buffer solution of human platelet poor plasma (PPP) having a concentration of 5% by weight, at 37° C. for 1 hour, the amount of protein adsorbed to the surfaces thereof is preferably 0.8 $\mu$g/cm$^2$ or less, more preferably 0.6 $\mu$g/cm$^2$ or less (in terms of albumin according to a Micro-BCA method). When the amount of protein adsorbed at contacting the blood is larger than 0.8 $\mu$g/cm$^2$, the adhesion and activation of platelets which occur subsequently cannot be suppressed completely and hence, thrombus formation is liable to proceed. Although it is desirable that the amount of protein adsorbed be as small as possible, the medical materials are actually fully effective, if it is in the range of 0.3 to 0.7 $\mu$g/cm$^2$.

Further, researches conducted by the inventors of the present invention have revealed that a polyether ester copolymer which essentially consists of recurring units represented by the following formula (12):

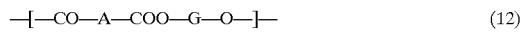

$$-[-CO-A-COO-G-O-]- \qquad (12)$$

wherein A is a divalent aromatic group having 6 to 12 carbon atoms and G is a divalent aliphatic hydrocarbon group having 2 to 15 carbon atoms, and recurring units represented by the following formula (13):

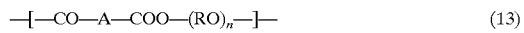

$$-[-CO-A-COO-(RO)_n-]- \qquad (13)$$

wherein A is defined the same as above, R is an alkylene group having 2 or 3 carbon atoms or a combination of an alkylene group having 2 or 3 carbon atoms and an alkylene group having 4 carbon atoms and n is a numeral which ensures that the molecular weight of a unit represented by —(RO)$_n$— is in the range of 400 to 20,000, (the recurring units represented by —(RO)$_n$— in the above formula (13) being contained in a proportion of 30 to 90% by weight based on the total weight of the recurring units of the above formulas (12) and (13)), can not be said to be novel by itself, but it has been found that the copolymer exhibits excellent blood compatibility, for example, antithrombogenic property, like the polyalkyl ether/polyaryl ether sulfone copolymer and polyalkyl ether/polyaryl ether ketone copolymer of the present invention.

The above polyether ester copolymer essentially consists of the recurring units represented by the above formulas (12) and (13).

Letter A in the above formulas (12) and (13) represents a divalent aromatic group having 6 to 12 carbon atoms.

Illustrative examples of the aromatic group include p-phenylene, m-phenylene 2,6-naphthylene, 2,7-naphthylene, 1,4-naphthylene, 1,5-naphthylene, 4,4'-biphenylene, 2,2'-biphenylene and the like, out of which p-phenylene and 2,6-naphthylene are preferred.

In the formula (12), G is a divalent hydrocarbon group having 2 to 15 carbon atoms. Illustrative examples of the hydrocarbon group include alkylene groups such as ethylene, trimethylene, propylene, tetramethylene, hexamethylene, octamethylene, decamethylene and dodecamethylene; and cycloalkylene groups such as 1,4-cyclohexanedimethylene, out of which alkylene groups having 2 to 10 carbon atoms such as tetramethylene and hexamethylene are preferred.

In the formula (13), R is an alkylene group having 2 or 3 carbon atoms or a combination of an alkylene group having 2 or 3 carbon atoms and an alkylene group having 4 carbon atoms. Illustrative examples of the alkylene group are the same as those for the formula (2). R in the formula (13) is preferably an ethylene group.

As the polyether ester copolymer consisting of the recurring units represented by the above formulas (12) and (13), preferred is a copolymer in which A in the above formula (12) is p-phenylene or 2,6-naphthylene and G is an alkylene group having 4 to 6 carbon atoms such as tetramethylene or hexamethylene, R in the above formula (13) is ethylene and the molecular weight of the polyoxyalkylene unit is 1,000 to 6,000, since it exhibits polymerizability, processability and excellent blood compatibility.

Specific examples of the polyether ester copolymer include polyethylene glycol/polytetramethylene terephthalate copolymer, polyethylene glycol/polytetramethylene-2, 6-naphthalate copolymer and the like.

The content of the polyoxyalkylene unit represented by —(RO)$_n$— in the above formula (13) is 30 to 90% by weight based on the total weight of the polyether ester copolymer consisting of the recurring units represented by the above formulas (12) and (13). When the content of the polyoxyalkylene unit which is a soft segment is less than 30% by weight of the polyether ester copolymer, the hydrophobic nature of the polyether ester copolymer is too high and the adsorption of protein and the adhesion of platelets cannot be suppressed completely. When the content is more than 90% by weight, the hydrophilic nature of the copolymer is too high, with the result that elution into water and striking swelling occur and mechanical strength becomes insufficient The content of the polyoxyalkylene unit is preferably 40 to 85% by weight, more preferably 50 to 80% by weight.

The polyether ester copolymer which essentially consists of the recurring units represented by the above formulas (12) and (13) may be a random copolymer or a block copolymer.

Such polyether ester copolymer may comprise at least one of the recurring units represented by the above formula (12) and at least one of the recurring units represented by the above formula (13).

The polyether ester copolymer in the present invention can be obtained by a conventionally known production method which comprises polycondensing under heating polyoxyalkylene glycol such as polyoxyethylene glycol, an aromatic dicarboxylic acid such as dimethyl terephthalate and/or an ester forming derivative thereof and 1,4-butane diol in the presence of a catalyst.

The catalyst used herein is a metal compound such as titanium, antimony, germanium, tin, zinc or the like. The produced polymer is allowed to change the molecular weight and content (copolymer composition) of polyoxyalkylene glycol to any desired values according to its application purpose. The polymerization degree of the produced polyether ester copolymer is preferably 1.0 to 5.0, more preferably 2.0 to 3.0, in terms of reduced viscosity, measured at 35° C. and at a concentration of 1.2 g/dl in a phenol/1,1,2,2-tetrachloroethane mixed solvent (weight ratio of 6/4).

It has been found that the above polyether ester copolymer exhibits satisfactory blood compatibility when it is blended with a polymer other than the above polymer.

Therefore, according to the present invention, there is provided the use of a polymer composition (to be referred to as "third preferred aspect of the present invention" hereinafter) as a starting material for producing a medical material to be used to contact the blood, the polymer composition which comprises (A') 1 to 99 parts by weight of the above polyether ester copolymer and (B') 1 to 99 parts by weight of at least one other polymer selected from the group consisting of polysulfone, polyaryl ether sulfone, cellulose triacetate, polypropylene, polyester, polymethacrylate, polyether ester, polyurethane and polycarbonate, the total weight of the polyether ester copolymer (A') and the polymer (B') being 100 parts by weight.

The polymer composition comprising 1 to 99 parts by weight of the above polyether ester copolymer (A') and 99 to 1 parts by weight of the above polymer (B') is novel and an object claimed by the present invention.

In the third preferred aspect of the invention, the other polymer such as polysulfone is the same as the polymer in the first and second preferred aspects of the present invention.

It should be understood that the description given in the above first and second preferred aspects can be directly applied to items omitted in the third preferred aspect of the invention, such as type of a medical material, a coating method and a method for preparing a polymer composition.

In the polymer composition of the third preferred aspect, the polyether ester copolymer (A') and the polymer (B') form separate phases without being mixed with each other uniformly in a molecular level, and are present as separate phases.

According to the present invention, by making use of the properties of the polymer composition, there is provided a medical material to be used to contact the blood, which is characterized in that a portion having at least a surface used to contact the blood is formed from a polymer composition comprising the polyether ester copolymer (A') and the polymer (B') and that the concentration of the polyether ester copolymer (A') in the vicinity of the surface of the portion is higher than the concentration of the polyether ester copolymer (A') contained in the whole polymer composition forming the portion.

In this medical material, the polymer composition preferably comprises 5 to 20 parts by weight of the polyether ester copolymer (A') and 80 to 95 parts by weight of the polymer (B') (the total weight of both materials is 100 parts by weight), and the proportion of the polyether ester copolymer (A') in the vicinity of the surface is 50 to 90 parts by weight based on the same standard.

The proportion of the polyether ester copolymer (A') in the vicinity of the surface is higher than the proportion (concentration) of the polyether ester copolymer (A') contained in the whole polymer composition when a medical material is produced from an organic solvent solution of the polymer composition. That is, as the organic solvent is scattered from the solution, phase separation occurs and a medical material having a high concentration of the polyether ester copolymer (A') in the vicinity of the surface is obtained in the end. The "vicinity of the surface" means an area down to a depth of about 100 Å from the surface.

According to the present invention, the medical material having a thin portion to be used to contact the blood is advantageously produced by the following method in particular.

In other words, according to the present invention, there is further provided a method for producing a medical material, which comprises the steps of:

preparing a dope comprising the polyether ester copolymer (A'), the polymer (B') and an aprotic polar organic solvent (C) capable of dissolving these, the total concentration of the components (A') and (B') being 1 to 30% by weight;

forming the dope into a thin film; and subjecting the thin film to a wet or dry molding method to produce a medical material having a 1 mm or less thick portion to be used to contact the blood.

It should be understood that the above description of a method for producing a medical material having a 1 mm or less thick portion and comprising the polyalkyl ether/ polyaryl ether sulfone copolymer or polyalkyl ether/polyaryl ether ketone copolymer (A) of the present invention is directly applied to this production method.

If the amount of protein adsorbed when any of the medical materials of the present invention which comprise the above polyether ester copolymer (A') are contacted to a phosphoric acid buffer solution of human platelet poor plasma (PPP) having a concentration of 5% by weight at 37° C. for 1 hour is 0.8 $\mu g/cm^2$ or less (in terms of albumin measured by a Micro-BCA method), the protein adsorption and blood corpuscle adhesion are low, and antithrombogenic properties such as the suppression of the denaturation of protein adsorbed and the adhesion and activation of platelets contacted protein are good advantageously. If the amount of protein adsorbed at the time of contacting the blood is more than 0.8 $\mu g/cm^2$, the adhesion and activation of platelets following the adsorption of protein cannot be suppressed completely and hence, thrombus formation may proceed. The amount of protein adsorbed is more preferably 0.3 to 0.5 $\mu g/cm^2$.

The reason why the polyalkyl ether/polyaryl ether sulfone or polyalkyl ether/polyaryl ether ketone, polyether ester copolymer and a blend polymer containing the same in the present invention exhibit excellent blood compatibility is assumed to be as follows.

The above copolymer has a hard component which is a hard site and a hydrophilic polyoxyalkylene glycol chain fixed in the main chain of the polymer. Both the hydrophilic segment and hydrophobic segment are characterized by the molecular structure in which phases are separated from one another thermodynamically and microscopically. Since such a polymer has no hydrogen bond-providing group in most part of the main chain, the interaction between main chains is weak and its contact with molecules of water, which can reduce hydrophobic interaction easily occurs. Therefore, in the presence of water (blood), a hydrated hydrogel layer is formed on the interface at which the polymer contacts with water. Owing to this, the protein adsorption and blood corpuscles adhesion are low and the denaturation of protein adsorbed as well as the adhesion and activation of contacted platelets can be suppressed. Further, it is assumed that the activation of complements and damage to a cell membrane can be avoided because the number of polyoxyalkylene free terminal chains and the number of free hydroxyl group terminals greatly reduce.

The polymer composition comprising the above copolymer is microscopically separated in phase from the other polymer which is a medical polymer material and the other polymer component to be blended. In the preparation of the blend polymer, for example, in the removal of the solvent in the case of wet blending, the polyoxyalkylene units of the copolymer are orientated in the interface between the blend polymer and bulk (such as air/blend polymer interface or water/blend polymer interface) rather than the interior of the blend polymer to stabilize interface free energy in the blend polymer. Therefore, the copolymer is orientated in most part of its water contacting interface in the presence of water (blood) and the hydrogel layer of the hydrated copolymer is formed. Owing to this, the adsorption of protein and the adhesion of blood corpuscles is small and the denaturation of protein adsorbed and the adhesion and activation of contacted platelets can be suppressed. Further, it is assumed that the activation of complements and damage to a cell membrane can be avoided because the number of polyoxyalkylene free terminal chains and the number of free hydroxyl group terminals greatly reduce.

To further illustrate the present invention, and not by way of limitation, the following examples and comparative examples are given. "Parts" in the following examples means "parts by weight" unless otherwise specified.

The reduced viscosity ($\eta_{sp}/c$) of the polyalkyl ether/ polyaryl ether sulfone or ketone copolymer was measured as follows. 120 mg of the copolymer was dissolved in 10 ml of a phenol/1,1,2,2-tetrachloroethane mixed solvent (weight ratio of 6/4) and measured for its reduced viscosity at 35° C.

The number average molecular weight was measured by a GPC (developing solvent: chloroform, in terms of polystyrene).

The $^1$H-NMR spectrum was measured in a mixed solvent ($CF_3COOD/CHCl_3=1/1$) using the JNM-A600 of Japan Electron Optical Laboratory (JEOL).

The quantitative evaluation of protein adsorbed was determined by a Micro-BCA method. This method is a protein quantitative determination method using a Micro-BCA kit (Micro BCA Assay Reagent Kit manufactured by Pierce Co., Ltd.) which employs copper ions and a BCA protein detection reagent shown by the following chemical structure. Since only copper ions reduced to a valence of 1 by protein present in a sample are allowed to cause a chelating reaction with the reagsent thereby to develop a color (570 nm), the concentration of protein (in terms of albumin) can be determined by measuring the absorbance of a sample.

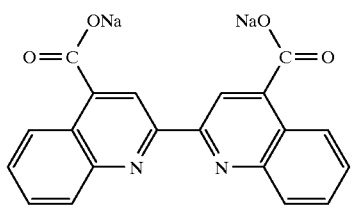

BCA; MW = 388.27

Micro reagent A contains sodium carbonate, sodium bicarbonate and sodium tartarate in 0.2N NaOH. Micro reagent B contains 4% BCA in water. Micro reagent C contains 4% cupric sulfate, pentahydrate in water.

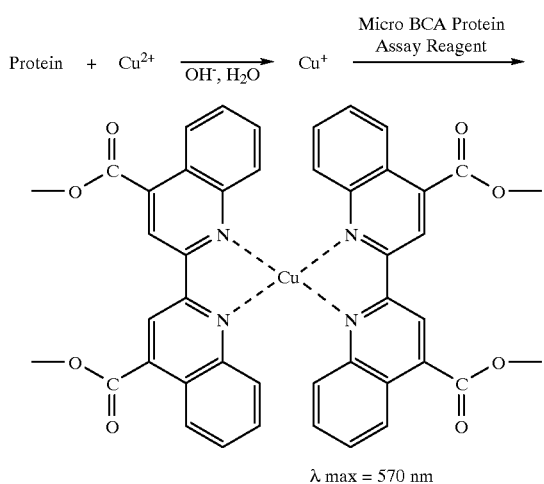

λ max = 570 nm

For the measurement of a surface composition by ESCA, a film was cut to form a 1 cm-diameter disk as a measurement sample. ESCALAB-200 of VG Co. Ltd. was used as the measurement instrument, and an MgKα-ray was irradiated onto the sample at an incident angle of 45° and scanning was effected. The measurement was made on a surface (front side) which was in contact with an air interface at the time of casting.

An SEM photo was taken by cutting out a 5×5 mm piece of a gold-deposited sample prepared by gold spattering and fixing it on a copper sample plate to make an observation sample. The top surface of this sample was observed by SEM (scanning electron microscopy) using S-510 of Hitachi, Ltd.

SYNTHESIS EXAMPLE 1

(Synthesis of α,ω-bis(2-chloroethoxy)polyoxyethylene)

30 parts of polyoxyethylene glycol (#2000), 3.2 parts of pyridine and 150 parts of dehydrated chloroform were charged into a three necked round bottom flask and stirred to prepare an uniform solution. To this was added a mixed solution containing 2.4 parts of thionyl chloride and 15 parts of dehydrated chloroform dropwise over 30 minutes while cooling it with ice. After the ice was removed and the liquid temperature rose to room temperature, stirring was further continued for another 8 hours. The chloroform was distilled off under reduced pressure and then, 15 parts of new thionyl chloride was further added, and dried by distillation under heating for 24 hours. Thereafter, excess thionyl chloride was distilled off under reduced pressure, and the residue was dissolved in 300 parts of new chloroform, washed with 200 parts of a saturated NaCl solution three times and then with 200 parts of pure water once to dispense a chloroform layer, and dried over anhydrous sodium sulfate for one night. An oily liquid obtained by removing chloroform solidified immediately at room temperature. The oily liquid was heated to be dissolved into 40 parts of acetone and reprecipitated with 200 parts of diethyl ether to obtain 28.8 parts of white powdery crystals. The product had a melting point of 50.5 to 53.5° C. It was confirmed from an IR (infrared spectroscopy) chart that this compound was α,ω-bis(2-chloroethoxy)polyoxyethylene (number average molecular weight of 2,000).

EXAMPLES 1 TO 6

(Preparation of Polyalkyl Ether/Polyaryl Ether Sulfone Copolymer)

12.64 parts of 4,4'-isopropylidenebisphenol, 12.74 parts of bis(4-chlorophenyl)sulfone, 22.11 parts of α,ω-bis(2-chloroethoxy)polyoxyethylene (number average molecular weight of 2,000), 20 parts of toluene and 8.63 parts of potassium carbonate were charged into a three-necked flask having nitrogen introducing and discharging ports, which was then guided to a Dean-Starks trap, substituted with nitrogen and heated at 110° C. under reflux for 6 hours to cause a reaction. After completion of effluent of water caused by this reaction, toluene was distilled off and 20 parts of N,N-dimethylacetoamide was newly added. The inside of the flask was substituted with nitrogen and the content was further heated at 160° C. for 15 hours under stirring to cause a reaction. The thus obtained polymer was extracted with chloroform, reprecipitated with methanol, washed with boiling water and dried. The finally obtained polymer was measured for its reduced viscosity and number average molecular weight. The results are shown in Table 1.

Further, the same operation as described above was repeated to produce various polyalkyl ether/polyaryl ether sulfone copolymers and measure their reduced viscosities and number average molecular weights.

The structures of the obtained polymers were confirmed by NMR, IR or the like. As an example, an NMR chart of the polyalkyl ether/polyaryl ether sulfone copolymer (PEO2000 (30)-co-PS(70)) obtained in Example 2 is shown in FIG. 1.

EXAMPLES 7 TO 9

(Production of Polyalkyl Ether/Polyaryl Ether Ketone Copolymer)

10.00 parts of bis(4-hydroxyphenyl)methane, 8.12 parts of bis(4-fluoro)benzophenone, 38.75 parts of α,ω-bis(2-chloroethoxy)polyoxyethylene (number average molecular weight of about 2,000), 20 parts of toluene, 20 parts of diphenyl sulfone and 7 parts of potassium carbonate were charged into a three-necked flask having nitrogen introducing and discharging ports, which was then guided to a Dean-Starks trap, substituted with nitrogen and heated at 110° C. under reflux for 6 hours to cause a reaction. After completion of effluent of water caused by this reaction, toluene was distilled off and 10 parts of diphenyl sulfone was newly added. The inside of the flask was substituted with nitrogen and the content was further heated at 200° C. for 15 hours under stirring to cause a reaction. The thus obtained polymer was extracted with chloroform, reprecipitated with methanol, washed with boiling water and dried. The finally obtained polymer was measured for its reduced viscosity and number average molecular weight. The results are shown in Table 1.

Further, the same operation as described above was repeated to produce various polyalkyl ether/polyaryl ether ketone copolymers. The results are shown in Table 1.

Figure 2:
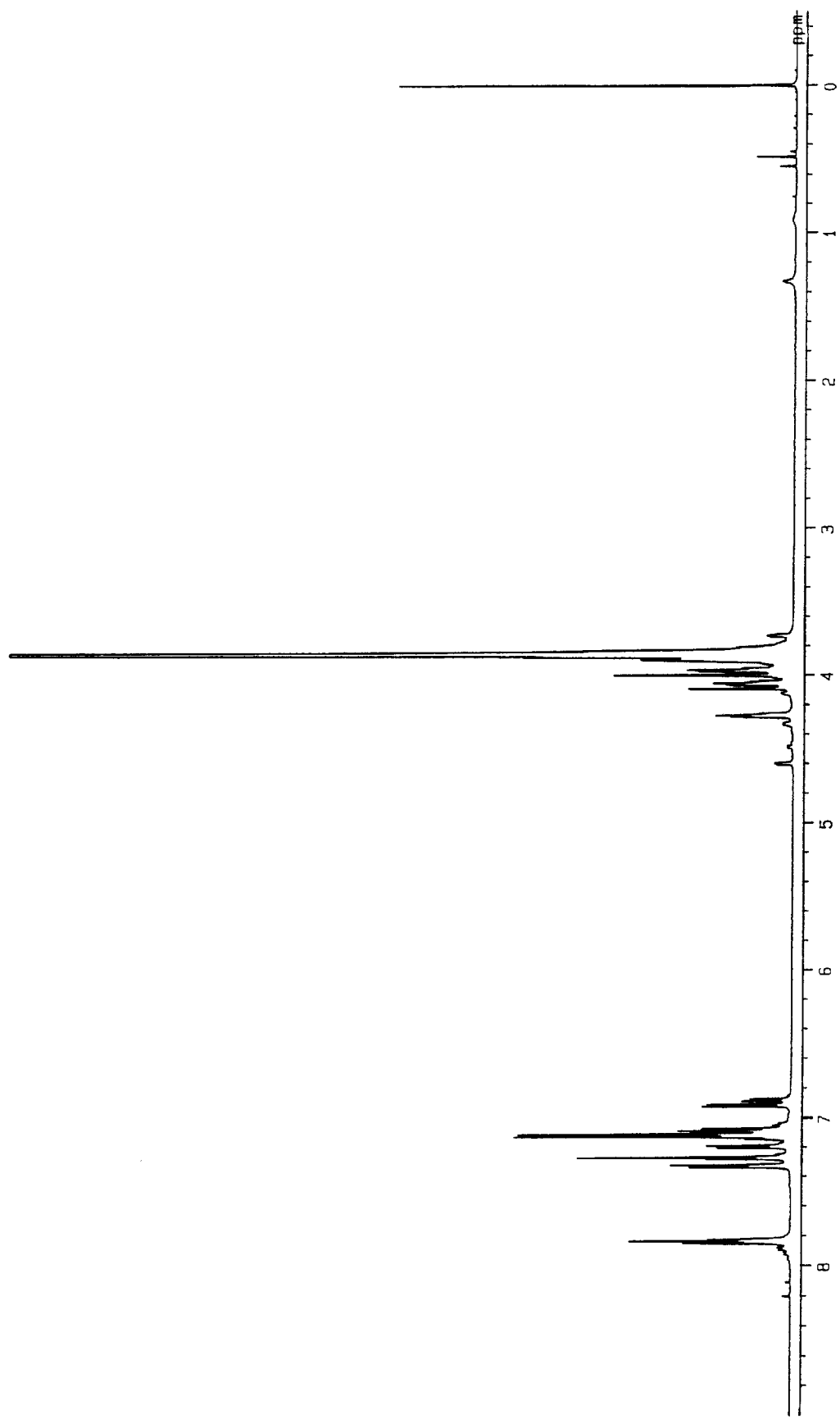
FIG. 2 is an NMR chart of a polyalkyl ether/polyaryl ether ketone copolymer obtained in Example 7.

The structures of the obtained polymers were confirmed by NMR, IR or the like. As an example, an NMR chart of the polyalkyl ether/polyaryl ether ketone copolymer (PEO2000 (70)-co-PMEK(30)) obtained in Example 7 is shown in FIG. 2.

Reference Example 1

(Production of Polyether Ester Copolymer)

17.1 g (0.070 mol) of dimethyl naphthalate, 44.96 g (0.020 mol) of polyoxyethylene glycol #2000 (number average molecular weight of 2,000), 10.7 g (0.120 mol) of 1,4-butane diol, and 0.02 g (2 ml as 10 ppm toluene solution)

of tetrabutoxytitanium were mixed in a 100-ml three-necked flask with a round bottom and the inside of the flask was fully substituted with nitrogen. Thereafter, the resulting mixture was caused to react at 215 to 230° C. at ordinary pressure for 5 hours and an ester exchange reaction was carried out while methanol distilled out was removed. Excess 1,4-butane diol was distilled off at 235° C. over 2 hours and a reaction was carried out at 76 cmHg for 2 hours and at 0.3 to 0.2 mmHg for 6 hours to obtain an achromatic semi-transparent polymer. The copolymerization composition of a polyoxyethylene glycol component contained in the polymer was 70% by weight. The reduced viscosity ($\eta_{sp}/c$) of the polymer, measured at 35° C. by dissolving 120 mg of the polymer in a phenol/1,1,2,2-tetrachloroethane mixed solvent (weight ratio of 6/4) was 2.7.

The polyoxyethylene glycol component proportion, number average molecular weight and reduced viscosity of each of the thus obtained polymers are shown in Table 1.

TABLE 1

| Polymer | | Polyoxyethylene glycol component | | Number average molecular weight | Reduced Viscosity ($\eta_{sp}/c$) |
|---|---|---|---|---|---|
| | | Number average molecular weight | Composition (wt. %) | | |
| Ex. 1 | PEO 2000(50)-CO-PS(50) | 2000 | 50 | 33,000 | 1.13 |
| Ex. 2 | PEO 2000(30)-CO-PS(70) | 2000 | 30 | 31,000 | 1.10 |
| Ex. 3 | PEO 3000(70)-CO-PPES(30) | 3000 | 70 | 82,000 | 4.10 |
| Ex. 4 | PEO 3000(60)-CO-PPES(40) | 3000 | 60 | 85,000 | 4.35 |
| Ex. 5 | PEO 3000(50)-CO-PES(50) | 3000 | 50 | 28,000 | 2.43 |
| Ex. 6 | PEO 2000(50)-CO-PES(50) | 2000 | 50 | 26,000 | 2.36 |
| Ex. 7 | PEO 2000(70)-CO-PMEK(30) | 2000 | 70 | 32,000 | 1.52 |
| Ex. 8 | PEO 3000(70)-CO-PMEK(30) | 3000 | 70 | 38,000 | 1.88 |
| Ex. 9 | PEO 3000(70)-CO-PREK(30) | 3000 | 70 | 44,000 | 2.33 |
| Ref. Ex. 1 | PEO 2000(70)-CO-PBN(30) | 2000 | 70 | 58,000 | 2.7 |

Ex.: Example
Ref. Ex.: Reference Example

In the above Table, the abbreviations of the polymers stand for the following structural formulas and the figures in the parentheses indicate composition ratios (% by weight).

PEO-co-PS:

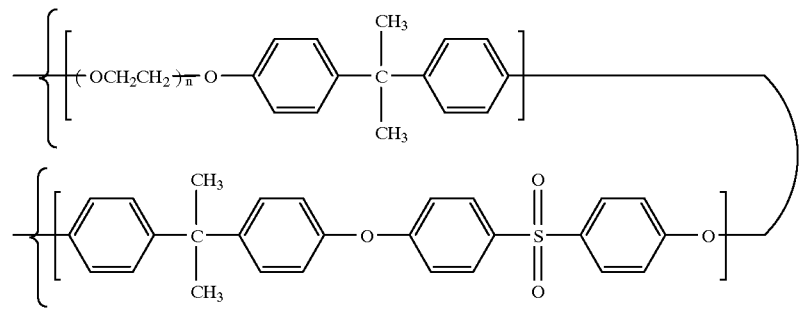

PEO-co-PES:

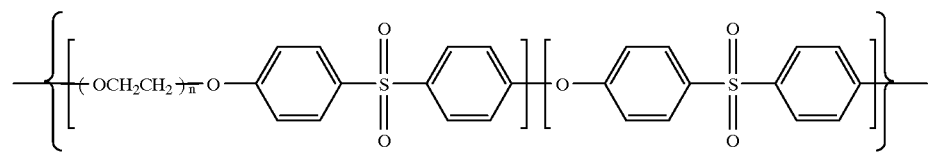

PEO-co-PPES:
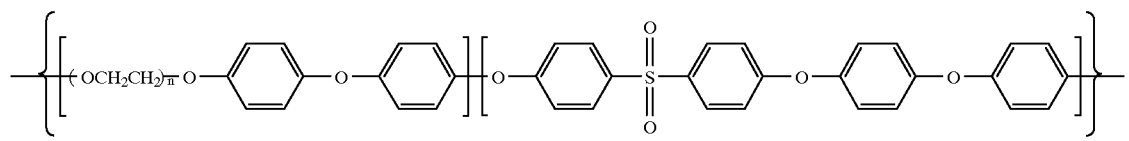
PEO-co-PMEK:
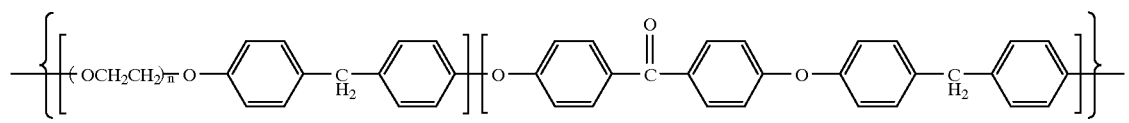
PEO-co-PREK:
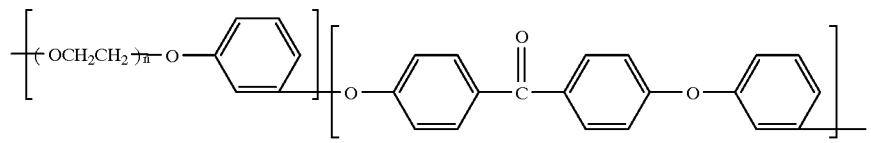
PEO-co-PBN:
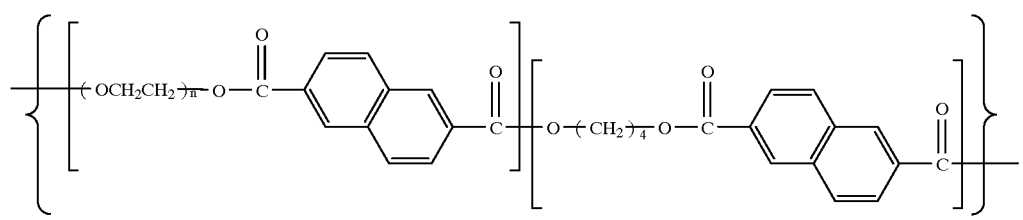
The structures and abbreviations of polymers other than those used in Examples and Comparative Examples are shown below.
Polysulfone: (PS)
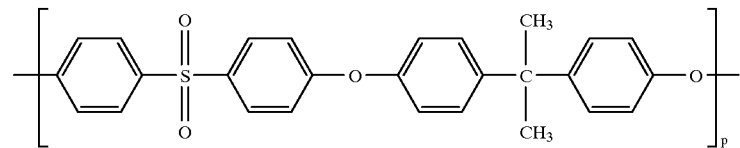
Polyaryl ether sulfone: (PES)
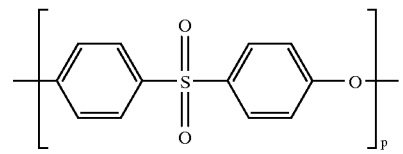
Cellulose triacetate: (TAC)
Polypropylene: (PP)
Polyurethane: (PU)
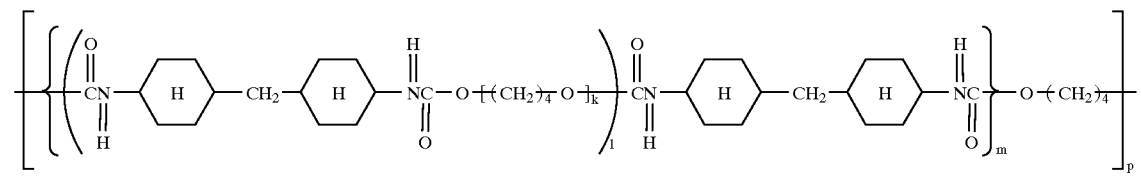
Tecoflex 60 (a product of Terumo Electron Co., Ltd.)

Polycarbonate: (PC)

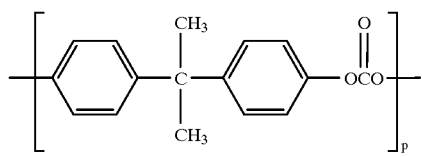

Polyvinyl chloride: (PVC)
Polyethyleneterephthalate: (PET)

Silicone resin: A vulcanized, crosslinked product of the following formula and a reinforcing filler therefor.

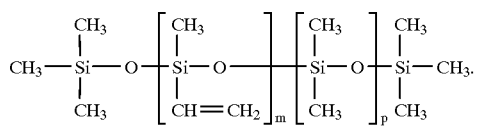

EXAMPLES 10 TO 15
(Evaluation of Antithrombogenic Properties of Polyalkyl Ether/Polyaryl Ether Sulfone and Ketone Copolymers)

(1) Preparation of Samples for Evaluation

The polyalkyl ether/polyaryl ether sulfone and ketone copolymers produced in the above examples were each dissolved in chloroform to prepare dope solutions having a concentration of 1.0% by weight. A sterilized polyethylene terephthalate (PET) disk (diameter of 15 mm and thickness of 0.5 mm) was immersed in 10 ml of each of the dope solutions. After 1 minute, the PET disk was taken out and left in a solvent atmosphere for one night to allow the solvent to volatilize. Thus, samples of PET coated with the copolymer were prepared.

(2) Evaluation of Amount of Protein Adsorbed

When the sample prepared in the above (1) was brought into contact with a human platelet poor plasma (PPP) solution, the amount of protein adsorbed to the copolymer was determined spectroscopically. For evaluation, a phosphoric acid buffer solution containing PPP in a predetermined concentration (a 5 wt. % phosphoric acid buffer solution) was brought into contact with the above sample for 1 hour and the protein adsorbed was extracted with 1% by weight of an aqueous solution of dodecyl sodium sulfate. Thereafter, the amount of protein adsorbed was estimated by a Micro-BCA method. The number of samples was 4 for each Example.

(3) Evaluation of Amount of Platelets Adhered by SEM Observation

Generally speaking, it is known that type of protein adsorbed to the surface of a material and the orientation of the protein on the surface take great part in the adhesion and aggregation of platelets which are the prestages of serious thrombus formation. The activation of platelets adhered such as deformation and release of particles has an influence on their aggregation, thrombus formation in platelets and the promotion of a reaction of coagulation factors, that follow the activation. Therefore, the degree of compatibility of a material with blood can be roughly estimated by observing the state of platelets adhered to the surface of the material after the material is brought into contact with the blood (total blood or component blood). In the present case, the state of platelets adhered to the surface of a polymer which had been brought into contact with human platelet rich plasma (PRP) was observed by SEM. As the PRP was used a supernatant liquid obtained by adding 1/9 part by volume of an aqueous solution containing 3.5% by weight of trisodium citrate to fresh blood collected from the vein of an upper part of a human arm and centrifuging at 1,000 rpm for 10 minutes.

The sample coated with the above copolymer was brought into contact with 0.7 ml of PRP in a culture Petri dish (Falcon, 24 wells) at 37° C. for 3 hours. This sample was then washed well with distilled water and fixed in an aqueous solution containing 2.5% by weight of glutaraldehyde at room temperature over 2 hours, freeze dried and subjected to gold spattering to prepare a sample to be observed. Using this sample, the number of platelets adsorbed to the surface was counted by SEM. The number of samples was 2 for each Example.

Figure 3A:
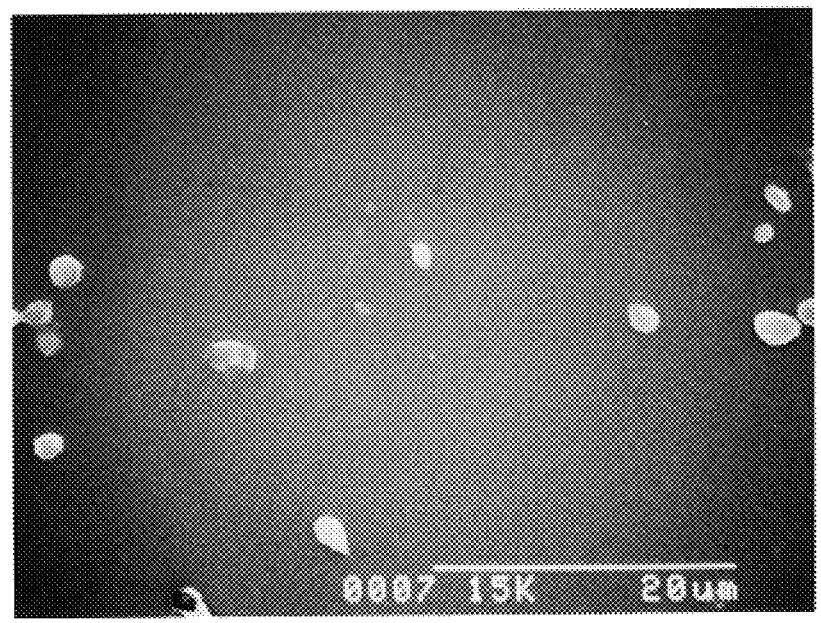
FIGS. 3(a) and 3(b) show respectively SEM photos for evaluating the amount of protein adsorbed and the number of platelets adhered in Examples 11 and 15.
Figure 3B:

Table 2 shows the amount of protein adsorbed and the number of platelets adhered. FIG. 3 shows SEM photos of Examples 11 and 15.

TABLE 2

| Polymer A | Amount of protein adsorbed ($\mu g/cm^2$) | Number of platelet adhered (Per 1000 $\mu$ $m^2$) |
|---|---|---|
| Ex. 10 PEO 2000(50)-CO-PS(50) | 0.43 ~ 0.45 | 1 ~ 3 |
| Ex. 11 PEO 2000(30)-CO-PS(70) | 0.62 ~ 0.66 | 5 ~ 10 |
| Ex. 12 PEO 3000(70)-CO-PPES(30) | 0.41 ~ 0.45 | 1 ~ 3 |
| Ex. 13 PEO 3000(50)-CO-PES(50) | 0.43 ~ 0.50 | 2 ~ 4 |
| Ex. 14 PEO 2000(70)-CO-PMEK(30) | 0.42 ~ 0.50 | 3 ~ 5 |
| Ex. 15 PEO 3000(70)-CO-PMEK(36) | 0.41 ~ 0.47 | 1 ~ 3 |

Ex.: Example

It has been obvious from the above results that the polyalkyl ether/polyaryl ether sulfone and ketone copolymers of the present invention exhibit excellent antithrombogenic property with a trace amount of protein adsorbed and a small number of platelets adhered.

EXAMPLES 16 TO 22 AND COMPARATIVE EXAMPLES 1 TO 3

Evaluation (1) of Antithrombogenic Properties of Polymer Compositions (1) Surface Analysis by ESCA The polyalkyl ether/polyaryl ether sulfone copolymers produced in the above examples and the polymers shown in Table 3 below were dissolved under heating in N-methyl-2-pyrrolidone (NMP) in predetermined blend ratios to produce various dope solutions (concentration of 10% by weight). Each of these solutions was cast on a Teflon mold and the solvent was extracted with water to obtain a film (thickness of about 0.5 mm) of a polymer composition. The concentration of the above copolymer in the vicinity of the surface of this film was analyzed by ESCA.

(2) Evaluation of Antithrombogenic Properties

The amount of protein adsorbed and the number of platelets adhered were obtained in the same manner as in Examples 10 to 15.

Figure 4A:
FIGS. 4(a), 4(b) and 4(c) show respectively SEM photos for evaluating the amount of protein adsorbed and the number of platelets adhered in Examples 18 and 21 and Comparative Example 1.
Figure 4B:
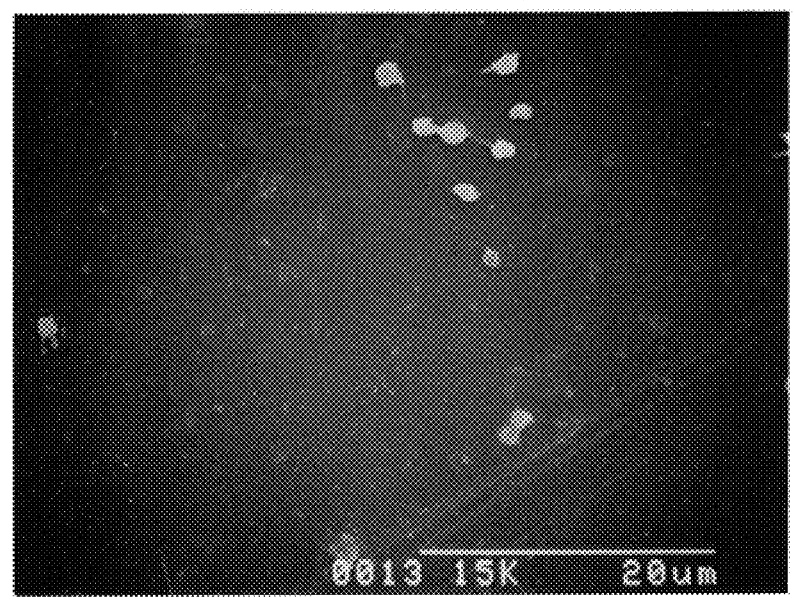
Figure 4C:
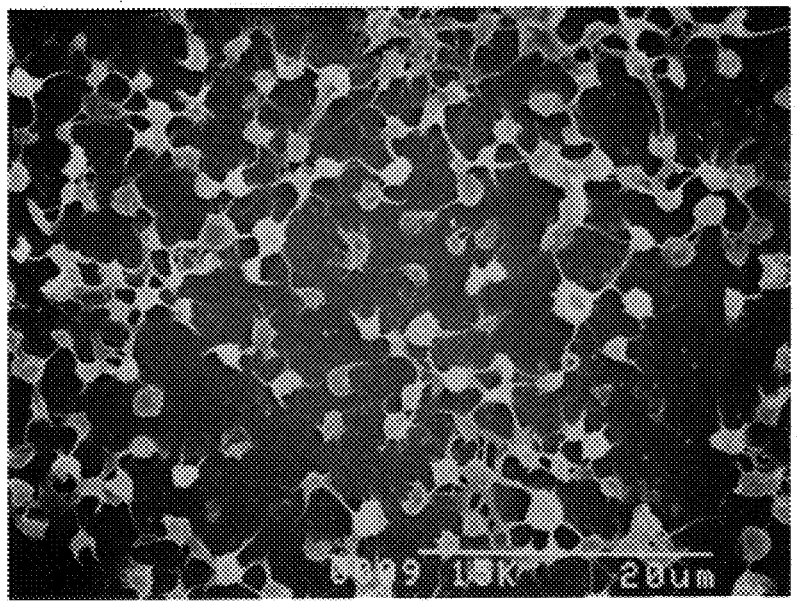

Table 3 shows the results of (1) and (2) and FIG. 4 shows SEM photos of Examples 18 and 21 and Comparative Example 1.

dope solutions (concentration of 10% by weight). Each of the solutions was then cast on a Teflon mold and the solvent was extracted with water to obtain an about 0.5 mm thick film of a polymer composition. The concentration of the copolymer in the vicinity of the surface of this film was analyzed by ESCA.

TABLE 3

| | Polymer A | Polymer B to be blended | A/B composition ratio | Composition of A of the surface (wt. %) | Amount of protein absorbed ($\mu g/cm^2$) | Number of platelet adhered (Per $1000\mu\ m^2$) |
|---|---|---|---|---|---|---|
| Ex. 16 | PEO 2000(50)-CO-PS(50) | PS | 10/90 | 61.3 | 0.62~0.67 | 4~20 |
| Ex. 17 | PEO 2000(50)-CO-PS(50) | PS | 20/80 | 73.9 | 0.52~0.56 | 2~10 |
| Ex. 18 | PEO 2000(50)-CO-PS(50) | PS | 50/50 | 85.5 | 0.47~0.53 | 1~5 |
| Ex. 19 | PEO 3000(70)-CO-PPES(30) | TAC | 10/90 | 81.5 | 0.51~0.65 | 3~9 |
| Ex. 20 | PEO 3000(70)-CO-PPES(30) | PC | 10/90 | 83.7 | 0.52~0.62 | 5~8 |
| Ex. 21 | PEO 3000(50)-CO-PES(50) | TAC | 10/90 | 77.6 | 0.59~0.69 | 6~12 |
| Ex. 22 | PEO 3000(50)-CO-PES(50) | PC | 10/90 | 78.1 | 0.58~0.68 | 9~15 |
| Comp. Ex. 1 | — | PS | — | — | 1.10~1.15 | 72~89 |
| Comp. Ex. 2 | — | TAC | — | — | 1.11~1.15 | 60~85 |
| Comp. Ex. 3 | — | PC | — | — | 1.21~1.45 | 81~95 |

Ex.: Example
Comp. Ex.: Comparative Example

EXAMPLES 23 TO 25

Evaluation (2) of Antithrombogenic Properties of Polymer Compositions

A film formed from each of polymer compositions ((PEO3000(70)-co-PPES (30))/polyurethane (EPU)=10/90 (composition ratio), (PEO3000 (50)-co-PES (50))/PU=10/90 and (PEO3000 (50)-co-PES (50))/PMMA=10/90) was prepared in the same manner as in the above Examples 16 to 22 and measured for the amount of protein adsorbed and the number of platelets adhered. Both amounts were found to be small.

It has been obvious from the above results that in the polymer compositions containing the polyalkyl ether/polyaryl ether sulfone or ketone copolymer of the present invention, the copolymer is present on the surface in a high concentration and the polymer compositions are excellent in ability to suppress the adsorption of protein and also suppress the adhesion of platelets significantly.

EXAMPLES 26 TO 30 AND COMPARATIVE EXAMPLE 4

Evaluation (3) of Antithrombogenic Property of Polymer Composition (1) Surface Analysis by ESCA The polyether ester copolymer produced in Reference Example 1 and each of the polymers shown in Table 4 below were dissolved under heating in N-methyl-2-pyrrolidone (NMP) in predetermined blend ratios to produce various (2) Evaluation of Antithrombogenic Properties The amount of protein adsorbed and the number of platelets adhered were obtained in the same manner as in the above Examples 10 to 15.

Figure 5:
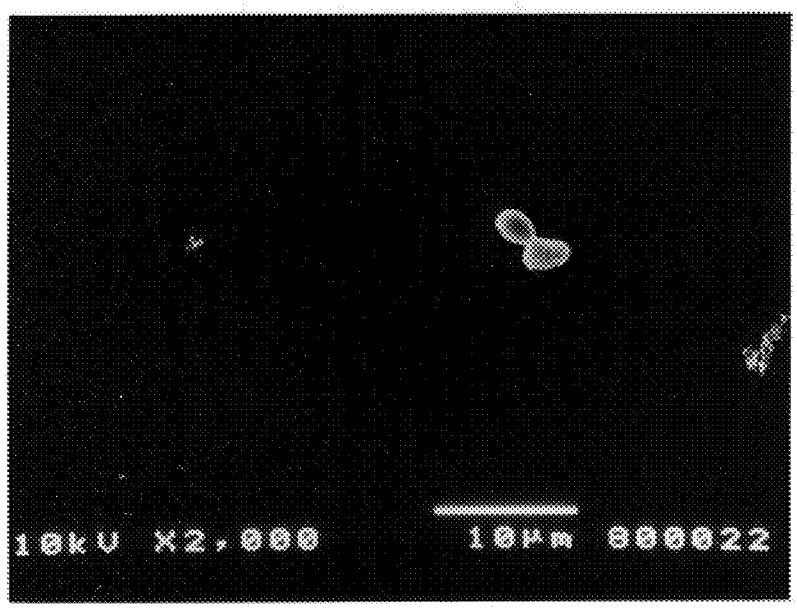
FIG. 5 shows a SEM photo for Example 28.

Table 4 shows the results of (1) and (2) and FIG. 5 shows a SEM photo of Example 28.

TABLE 4

| | Polymer A | Blend polymer B | A/B composition ratio (wt. %) | Composition of A of the surface (wt. %) | Amount of protein absorbed ($\mu g/cm^2$) | Number of platelet adhered (Per $1000\mu\ m^2$) |
|---|---|---|---|---|---|---|
| Ex. 26 | PEO 2000(70)-CO-PBN(30) | PES | 10/90 | 72.6 | 0.58~0.71 | 15~45 |
| Ex. 27 | PEO 2000(70)-CO-PBN(30) | PES | 20/80 | 85.8 | 0.56~0.62 | 3~15 |
| Ex. 28 | PEO 2000(70)-CO-PBN(30) | PES | 50/50 | 89.9 | 0.47~0.49 | 2~7 |
| Ex. 29 | PEO 2000(70)-CO-PBN(30) | PS | 10/90 | 65.6 | 0.58~0.71 | 13~41 |
| Ex. 30 | PEO 2000(70)-CO-PBN(30) | TAC | 10/90 | — | 0.54~0.56 | 10~35 |
| Comp. Ex. 4 | — | PES | — | — | 1.10~1.21 | 75~95 |

Ex.: Example
Comp. Ex.: Comparative Example

EXAMPLES 31 TO 33

Evaluation (4) of Antithrombogenic Properties of Polymer Compositions

A polymer composition consisting of each of polyester (PET), polyurethane (PU) and polymethyl methacrylate (PMMA) and the polyether ester copolymer of Reference Example 1 was used to form a film in the same manner as in the above Examples 26 to 30. The amount of protein adsorbed and the number of platelets adhered of the film were measured and found to be small.

It has been obvious from the above results that in the polymer composition containing the polyether ester copolymer of the present invention, the polyether ester is present on the surface in a high concentration and this polymer composition is excellent in ability to suppress the adsorption of protein and also suppresses the adhesion of platelets significantly.

EXAMPLE 34 TO 37 AND COMPARATIVE EXAMPLE 5

(Evaluation of Antithrombogenic Property of Polypropylene Having Coated Surface)
(1) Preparation of Sample for Evaluation A chloroform solution containing 1.0% by weight of each of the copolymers produced in the above Examples was prepared and a polypropylene film (diameter of 15 mm and thickness of 0.1 mm) was immersed in the solution. After 1 minute, the film was taken out and left in a solvent atmosphere for one night to allow the solvent to volatilize. Thus, samples of polypropylene coated with a film (thickness of 500 $\mu$m) of the copolymer were prepared.
(2) Evaluation of Antithrombogenic Property The amount of protein adsorbed and the number of platelets adhered were obtained in the same manner as in the above Examples 10 to 15.

Figure 6:
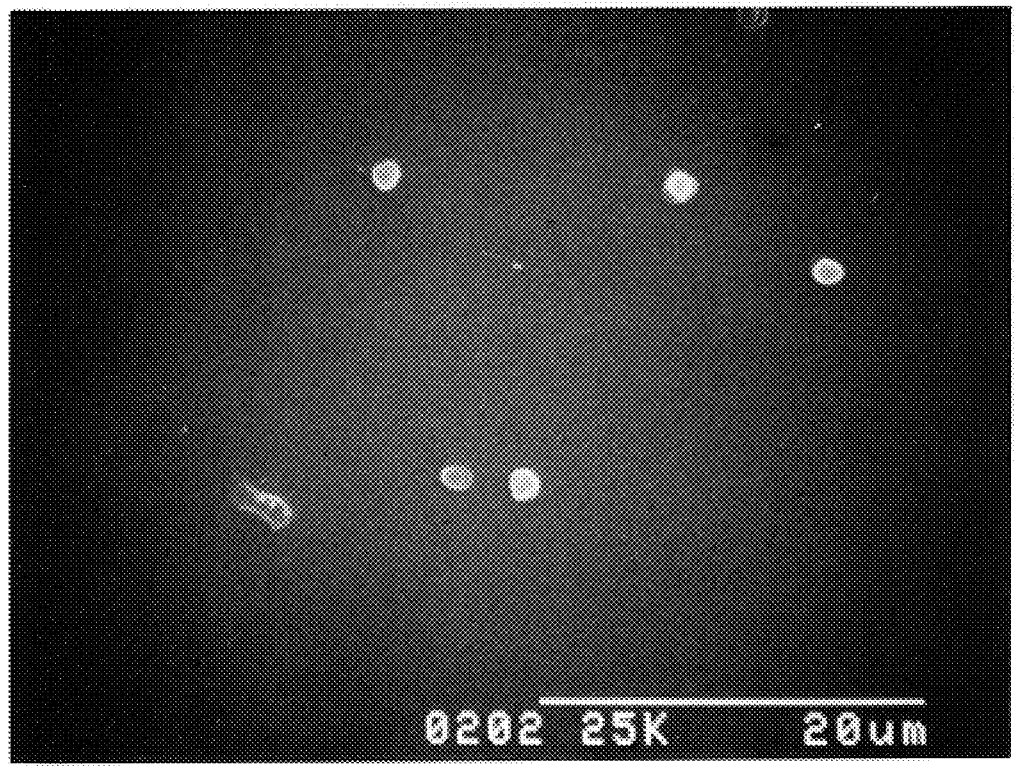
FIG. 6 shows a SEM photo for Example 36.

Table 5 shows the results of (2) and FIG. 6 shows a SEM photo of Example 36.

etate (manufactured by Daicel Chemical, number average molecular weight (in terms of polystyrene) of 250,000) was dissolved under heating in N-methyl-2-pyrrolidone (NMP) to prepare a dope solution of a cellulose triacetate composition (concentration of 13% by weight). This solution was injected into hot water from a nozzle to carry out a wet spinning to obtain an uniform porous membrane.
(2) Evaluation of Hollow Fiber Membrane This porous membrane was measured for its water-permeability (UFR), dialyzability (DA10000) and sieving coefficient (Sc70000).

Water permeability (UFR), dextran 10,000 dialyzability (DA10000) and dextran 70,000 sieving coefficient (SC70000) were evaluated as the dialyzing properties of the hollow fiber. A dialyzer having an effective membrane area of 1.5 $m^2$ was used for the evaluations. Measurement conditions are as follows.
(a) Water-Permeability (UFR)

A time necessary to permeate 20 ml of pure water through a sheath portion of a hollow fiber at a temperature of 35° C. under a differential pressure of 300 mmHg (39,996 Pa) applied between the inside surface and the outside surface of the hollow fiber, was measured.

The UFR in ml/$m^2$/hr/mmHg of the hollow fiber bundle was calculated from the amount of the water, the permeating

TABLE 5

| | Polymer A | Polymer whose surface is coated | Amount of protein adsorbed ($\mu$ g/cm$^2$) | Number of platelet adhered (Per 1000 $\mu$ m$^2$) |
|---|---|---|---|---|
| Ex. 34 | PEO 3000(70)-CO-PPES(30) | PP | 0.40 ~ 0.46 | 1 ~ 3 |
| Ex. 35 | PEO 2000(50)-CO-PES(50) | PP | 0.45 ~ 0.52 | 5 ~ 9 |
| Ex. 36 | PEO 2000(70)-CO-PMEK(30) | PP | 0.42 ~ 0.50 | 3 ~ 5 |
| Ex. 37 | PEO 3000(70)-CO-PMEK(30) | PP | 0.41 ~ 0.47 | 1 ~ 3 |
| Comp. Ex. 5 | — | PP | 1.11 ~ 1.15 | 70 ~ 85 |

Ex.: Example
Comp. Ex.: Comparative Example

EXAMPLES 38 TO 41

Evaluation of Antithrombogenic Properties of Polymer Materials Having Coated Surfaces Samples of polyvinyl chloride (PVC), polyurethane (PU), polyester (PET) and silicone resin coated with the above copolymer (PEO3000 (70)-co-PMEK (30)) were prepared in the same manner as in the above Examples 34 to 37 and measured for the amounts of protein adsorbed and the numbers of platelets adhered. All of the values were found to be small.

It has been obvious from the above results that polymers coated with the polyalkyl ether/polyaryl ether sulfone and ketone copolymers of the present invention have excellent antithrombogenic property with a trace amount of protein adsorbed and a small number of platelets adhered.

EXAMPLES 42 TO 44 AND COMPARATIVE EXAMPLE 6

Preparation and Evaluation of Hollow Fiber Membrane Produced by Wet Spinning from Dope Solution of Polymer Composition Comprising Polyalkyl Ether/Polyaryl Ether Sulfone Copolymer and Cellulose Triacetate
(1) Preparation of Hollow Fiber Membrane Each of the polyalkyl ether/polyaryl ether sulfone copolymers prepared in the above Examples and cellulose triacsurface area of the hollow fibers, the permeating time and the differential pressure.

(b) Dextran 10,000 Dialyzability (Dextran 10,000 DA)

An aqueous solution of 0.02% by weight of dextran 10,000 was flowed through the hollow spaces of the hollow fibers in the module, at a temperature of 37° C. at a flow rate of 200 ml/min, while allowing a portion of dextran 10,000 in the aqueous solution to be dialyzed through the hollow fibers, and the difference in concentration of dextran 10,000 between the supplied dextran 10,000 solution into an end of the module and the delivered dextran 10,000 solution from the opposite end of the module was measured.

The dextran 10,000 dialyzability of the hollow fiber bundle was calculated from the concentration difference.

(c) Dextran 70,000 Sieving Coefficient (Dextran 70,000 Sc)

An aqueous solution of 0.01% by weight of dextran 70,000 was subjected as an original solution to a permeation through the sheath portions of hollow fibers under a pressure of 10 mmHg (1,333.2 Pa).

The concentrate of dextran 70,000 in the resultant permeated solution was measured. The dextran 70,000 Sc was calculated from the measured data.

The test results are shown in Table 6.

TABLE 6

| | Polymer | Blend ratio into TAC (wt. %) | UFR (ml/m²/h/mmHg) | DA10000 (ml/min) | Sc70000 |
|---|---|---|---|---|---|
| Ex. 42 | PEO 2000(70)-co-PPES(30) | 10 | 450 | 52 | 0.062 |
| Ex. 43 | PEO 2000(50)-co-PES(50) | 10 | 710 | 60 | 0.010 |
| Ex. 44 | PEO 3000(50)-co-PES(50) | 10 | 800 | 68 | 0.119 |
| Comp. Ex. 6 | TAC | — | 760 | 70 | 0.130 |

Ex.: Example
Comp. Ex.: Comparative Example

A hollow fiber membrane prepared from any of cellulose triacetate compositions exhibited almost the same excellent dialyzability as that of cellulose triacetate. It has been obvious from this results that there can be provided a medical membrane material having excellent blood compatibility while retaining excellent membrane characteristics of cellulose triacetate by wet-spinning the cellulose triacetate composition of the present invention.

What is claimed is:

1. A method of using a polymer composition as a starting material for producing a medical material, which comprises employing a polymer composition comprising 1 to 99 parts by weight of a polyalkyl ether/polyaryl ether sulfone or ketone copolymer (A) and 1 to 99 parts by weight of a polymer (B) as the staring material for producing said medical material to be used to contact blood, the total weight of the copolymer (A) and the polymer (B) being 100 parts by weight and said polymer (B) being at least one polymer selected from the group consisting of polysulfone, polylaryl ether sulfone, cellulose triacetate, polyvinylchloride, polypropylene, polyurethane and polycarbonate, wherein the polyalkyl ether/polyaryl ether sulfone or ketone copolymer (A) has a reduced viscosity, measured at 35° C. in a mixed solvent of phenol and 1,1,2,2-tetrachloroethane in a weight ratio of 6/4, of at least 0.5 dl/g and wherein the polyalkyl ether/polyaryl ether sulfone or ketone copolymer (A) consists essentially of recurring units represented by the following formula (1):

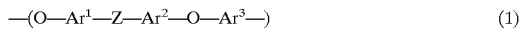

$$—(O—Ar^1—Z—Ar^2—O—Ar^3—) \qquad (1)$$

wherein $Ar^1$, $Ar^2$ and $Ar^3$ are the same or different and each is a divalent aromatic hydrocarbon group which may be substituted and Z is $>C=O$ or $>SO_2$, and recurring units represented by the following formula (2):

$$—(—(OR)_n—O—Ar^3—)— \qquad (2)$$

wherein R is an alkylene group having 2 or 3 carbon atoms or a combination of an alkylene group having 2 or 3 carbon atoms and an alkylene group having 4 carbon atoms, $Ar^3$ is defined the same as above and n is a numeral which ensures that the molecular weight of a unit represented by $—(OR)_n—$ is in the range of 400 to 20,000 the proportion of recurring units represented by the above formula (2) being present at least two units on average per molecule, and the proportion of the unit represented by $—(OR)_n$ in the above formula (2) being 10 to 90% by weight based on the total weight of the recurring units of the above formulas (1) and (2).

2. A polymer composition comprising 1 to 99 parts by weight of a polyalkyl ether/polyaryl ether sulfone or ketone copolymer (A) and 1 to 99 parts by weight of a polymer (B), the total weight of the copolymer (A) and the polymer (B) being 100 parts by weight and said polymer (B) being at least one polymer selected from the group consisting of polysulfone, polylaryl ether sulfone, cellulose triacetate, polyvinylchloride, polypropylene, polyurethane and polycarbonate, wherein the polyalkyl ether/polyaryl ether sulfone or ketone copolymer (A) has a reduced viscosity, measured at 35° C. in a mixed solvent of phenol and 1,1,2,2-tetrachloroethane in a weight ratio of 6/4, of at least 0.5 dl/g and wherein the polyalkyl ether/polyaryl ether sulfone or ketone copolymer (A) consists essentially of recurring units represented by the following formula (1):

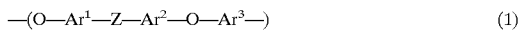

$$—(O—Ar^1—Z—Ar^2—O—Ar^3—) \qquad (1)$$

wherein $Ar^1$, $Ar^2$ and $Ar^3$ are the same or different and each a divalent aromatic hydrocarbon group which may be substituted and Z is $>C=O$ or $>SO_2$, and recurring units represented by the following formula (2):

$$—(—(OR)_n—O—Ar^3—)— \qquad (2)$$

wherein R is an alkylene group having 2 or 3 carbon atoms or a combination of an alkylene group having 2 or 3 carbon atoms and an alkylene group having 4 carbon atoms, $Ar^3$ is defined the same as above and n is a numeral which ensures that the molecular weight of a unit represented by $—(OR)_n—$ is in the range of 400 to 20,000 the proportion of recurring units represented by the above formula (2) being present at least two units on average per molecule, and the proportion of the unit represented by $—(OR)_n$ in the above formula (2) being 10 to 90% by weight based on the total weight of the recurring units of the above formulas (1) and (2).

3. A medical material for contact with blood wherein a portion having at least a surface for contact with blood is formed from a polymer composition comprising a polyalkyl ether/polyaryl ether sulfone or ketone copolymer (A) and polymer (B), said polymer (B) being at least one polymer selected from the group consisting of polysulfone, polylaryl ether sulfone, cellulose triacetate, polyvinylchloride, polypropylene, polyurethane and polycarbonate, and the concentration of copolymer (A) in the vicinity of the surface of said portion is higher than the concentration of copolymer (A) present in the entire polymer composition forming said portion, wherein the polyalkyl ether/polyaryl ether sulfone or ketone copolymer (A) has a reduced viscosity, measured at 35° C. in a mixed solvent of phenol and 1,1,2,2-tetrachloroethane in a weight ratio of 6/4, of at least 0.5 dl/g and wherein the polyalkyl ether/polyaryl ether sulfone or ketone copolymer (A) consists essentially of recurring units represented by the following formula (1):

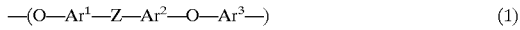

$$—(O—Ar^1—Z—Ar^2—O—Ar^3—) \qquad (1)$$

wherein $Ar^1$, $Ar^2$ and $Ar^3$ are the same or different and each a divalent aromatic hydrocarbon group which may be substituted and Z is >C=O or >SO$_2$, and recurring units represented by the following formula (2):

$$—(—(OR)_n—O—Ar^3—)— \quad (2)$$

wherein R is an alkylene group having 2 or 3 carbon atoms or a combination of an alkylene group having 2 or 3 carbon atoms and an alkylene group having 4 carbon atoms, Ar$^3$ is defined the same as above and n is a numeral which ensures that the molecular weight of a unit represented by —(OR)$_n$— is in the range of 400 to 20,000 the proportion of recurring units represented by the above formula (2) being present at least two units on average per molecule, and the proportion of the unit represented by —(OR)$_n$ in the above formula (2) being 10 to 90% by weight based on the total weight of the recurring units of the above formulas (1) and (2).

4. The medical material of claim 3, wherein the polymer composition comprises 5 to 20 parts by weight of copolymer (A) and 80 to 95 parts by weight of polymer (B), the total weight of both materials being 100 parts by weight, and the proportion of the copolymer (A) in the vicinity of the surface is 50 to 90 parts by weight based on the same standard.

5. The medical material of claim 3 which is a hollow yarn for an artificial kidney, a hollow yarn for an artificial lung, a catheter, a tube for blood circuit, a blood container, a hemodialysis membrane, a blood plasma separation membrane or a medical suture.

6. A method for producing a medical material which comprises the steps of:

preparing a dope comprising a polyalkyl ether/polyaryl ether sulfone or ketone copolymer (A), a polymer (B) and an aprotic organic solvent (C) capable of dissolving copolymer (A) and copolymer (B), said polymer (B) being at least one polymer selected from the group consisting of polysulfone, polylaryl ether sulfone, cellulose triacetate, polyvinylchloride, polypropylene, polyurethane and polycarbonate, the total concentration of components (A) and (B) being 1 to 30% by weight;

forming the dope into a thin film; and subjecting the thin film to wet or dry molding to produce a medical material having a 1 mm or less thick portion for contact with blood, wherein the polyalkyl ether/polyaryl ether sulfone or ketone copolymer (A) has a reduced viscosity, measured at 35° C. in a mixed solvent of phenol and 1,1,2,2-tetrachloroethane in a weight ratio of 6/4, of at least 0.5 dl/g and wherein the polyalkyl ether/polyaryl ether sulfone or ketone copolymer (A) consists essentially of recurring units represented by the following formula (1):

$$—(O—Ar^1—Z—Ar^2—O—Ar^3—) \quad (1)$$

wherein Ar$^1$, Ar$^2$ and Ar$^3$ are the same or different and each a divalent aromatic hydrocarbon group which may be substituted and Z is >C=O or >SO$_2$, and recurring units represented by the following formula (2):

$$—(—(OR)_n—O—Ar^3—)— \quad (2)$$

wherein R is an alkylene group having 2 or 3 carbon atoms or a combination of an alkylene group having 2 or 3 carbon atoms and an alkylene group having 4 carbon atoms, Ar$^3$ is defined the same as above and n is a numeral which ensures that the molecular weight of a unit represented by —(OR)$_n$— is in the range of 400 to 20,000 the proportion of recurring units represented by the above formula (2) being present at least two units on average per molecule, and the proportion of the unit represented by —(OR)$_n$ in the above formula (2) being 10 to 90% by weight based on the total weight of the recurring units of the above formulas (1) and (2).

7. The method of claim 6, wherein the aprotic polar organic solvent is at least one selected from the group consisting of tetrahydrofuran, 1,3-dioxolane, 1,4-dioxane, dimethylformamide, dimethylacetoamide, N-methyl-2-pyrrolidone, dimethylsulfoxide, methylene chloride and chloroform.

* * * * *